United States Patent
Peters et al.

(10) Patent No.: US 12,214,460 B2
(45) Date of Patent: Feb. 4, 2025

(54) ADAPTIVE WORKPIECE SUPPORT SYSTEM

(71) Applicant: The Boeing Company, Arlington, VA (US)

(72) Inventors: Justin Lee Peters, Carrollton, IL (US); Stephen Lynn Farabee, Wentzville, MO (US)

(73) Assignee: The Boeing Company, Arlington, VA (US)

( * ) Notice: Subject to any disclaimer, the term of this patent is extended or adjusted under 35 U.S.C. 154(b) by 46 days.

(21) Appl. No.: 18/335,747

(22) Filed: Jun. 15, 2023

(65) Prior Publication Data

US 2024/0261914 A1     Aug. 8, 2024

Related U.S. Application Data

(63) Continuation-in-part of application No. 18/163,962, filed on Feb. 3, 2023, now Pat. No. 11,835,076.

(51) Int. Cl.
  *B23Q 1/25*     (2006.01)
(52) U.S. Cl.
  CPC ............ *B23Q 1/25* (2013.01); *B23Q 2716/00* (2013.01)
(58) Field of Classification Search
  CPC ...... B23Q 1/25; B23Q 1/032; B23Q 2716/00; B23Q 3/102; F16B 21/16
  See application file for complete search history.

(56) References Cited

U.S. PATENT DOCUMENTS

| | | | | |
|---|---|---|---|---|
| 5,107,599 | A | * | 4/1992 | Marincic ............. G01B 5/0004 269/45 |
| 6,022,009 | A | * | 2/2000 | Hill ....................... B23Q 1/032 269/47 |
| 6,644,637 | B1 | | 11/2003 | Shen et al. |
| 9,308,610 | B2 | * | 4/2016 | Canuto ................. B23Q 3/105 |
| 10,046,428 | B2 | | 8/2018 | Phillips |
| 2015/0089791 | A1 | | 4/2015 | Werner, Jr. et al. |
| 2016/0375533 | A1 | * | 12/2016 | Nguyen ............... B23Q 1/0072 269/20 |
| 2019/0126415 | A1 | * | 5/2019 | Piccolo .................... B23Q 3/04 |
| 2024/0238942 | A1 | * | 7/2024 | Zimmer ................ B23Q 1/035 |

* cited by examiner

*Primary Examiner* — Seahee Hong
(74) *Attorney, Agent, or Firm* — Walters & Wasylyna LLC

(57) ABSTRACT

An adaptive workpiece support system comprising a wear plate comprising a precision datum face and a plurality of tool holes, and accessories interactive with the plurality of tool holes of the wear plate to support, locate, and hold a workpiece against the wear plate for machining the workpiece. The plurality of tool holes is laid out in a grid and extending through the precision datum face, a thickness of the wear plate, and a backside face of the wear plate. The wear plate is configured to locate a workpiece relative to three axes of a machine.

24 Claims, 28 Drawing Sheets

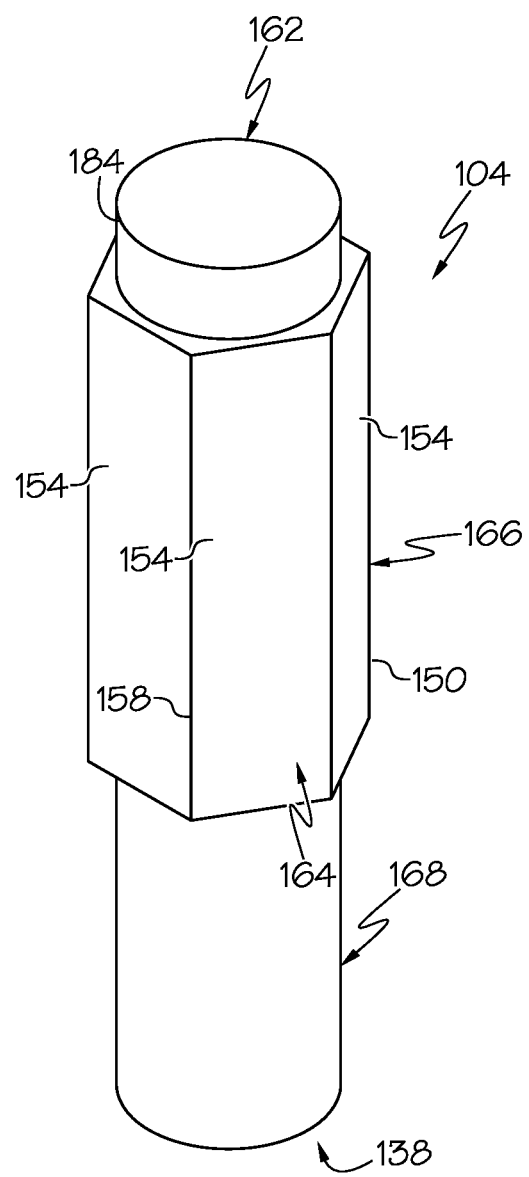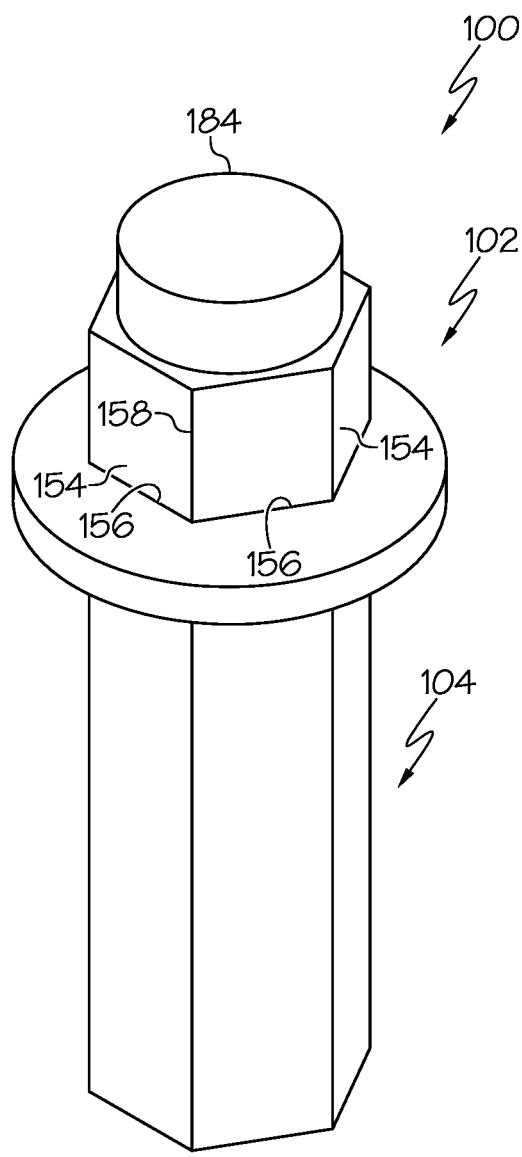

ADAPTIVE WORKPIECE SUPPORT SYSTEM

CROSS-REFERENCE TO RELATED APPLICATION

The present application is a Continuation-in-Part of U.S. patent application Ser. No. 18/163,962, filed on Feb. 3, 2023, entitled "Axial Locking Mechanisms and Methods for Supporting a Workpiece," the complete disclosure of which is incorporated herein by reference.

BACKGROUND INFORMATION

1. Field

The present disclosure relates generally to performing machining operations on workpieces and, more particularly, to mechanisms and methods for holding, locating, and supporting a workpiece during machining operations.

2. Background

Tooling fixtures are often used to rigidly support a workpiece while various manufacturing operations are performed. However, such tooling fixtures are expensive. Therefore, tooling fixtures may not be economically viable for small production runs. Additionally, tooling fixtures that are capable of adapting to different workpiece geometries are often complex and can apply an undesirable preload or stress on the workpiece during adjustment. Accordingly, those skilled in the art continue with research and development efforts in the field of adaptive supports for tooling fixtures.

SUMMARY

The following is a non-exhaustive list of examples, which may or may not be claimed, of the subject matter according to the present disclosure.

An embodiment of the present disclosure provides an adaptive workpiece support system. The adaptive workpiece support system comprises a wear plate comprising a precision datum face and a plurality of tool holes, and accessories interactive with the plurality of tool holes of the wear plate to support, locate, and hold a workpiece against the wear plate for machining the workpiece. The plurality of tool holes is laid out in a grid and extending through the precision datum face, a thickness of the wear plate, and a backside face of the wear plate. The wear plate is configured to locate a workpiece relative to three axes of a machine.

Another embodiment of the present disclosure provides a wear plate. The wear plate comprises a precision datum face configured to locate a workpiece flat relative to a primary machine axis; and a plurality of tool holes laid out in a grid and extending through the precision datum face, a thickness of the wear plate, and a backside face of the wear plate, wherein the plurality of tool holes is configured to locate the workpiece relative to a secondary machine axis and a tertiary machine axis.

Another embodiment of the present disclosure provides a method of machining a workpiece. The workpiece is positioned over a wear plate such that locating pins are positioned in the workpiece and in a first subset of a plurality of tool holes of the wear plate to locate the workpiece in a secondary machine axis and a tertiary machine axis of a machine, the wear plate comprising the plurality of tool holes laid out in a grid and extending through a precision datum face of the wear plate. The workpiece is lowered into contact with the precision datum face of the wear plate to locate the workpiece relative to a primary machine axis of the machine. The workpiece is machined to form a part in the workpiece while adjustable length supports extending from the workpiece are in contact with the backside of the workpiece to support the workpiece, wherein the adjustable length supports are connected to a second subset of the plurality of tool holes.

The features and functions can be achieved independently in various embodiments of the present disclosure or may be combined in yet other embodiments in which further details can be seen with reference to the following description and drawings.

BRIEF DESCRIPTION OF THE DRAWINGS

FIG. 4 is a schematic, perspective view of an example of the rod of the axial locking mechanism;

FIG. 5 is a schematic, perspective view of an example of the axial locking mechanism;

DETAILED DESCRIPTION

Figure 25:
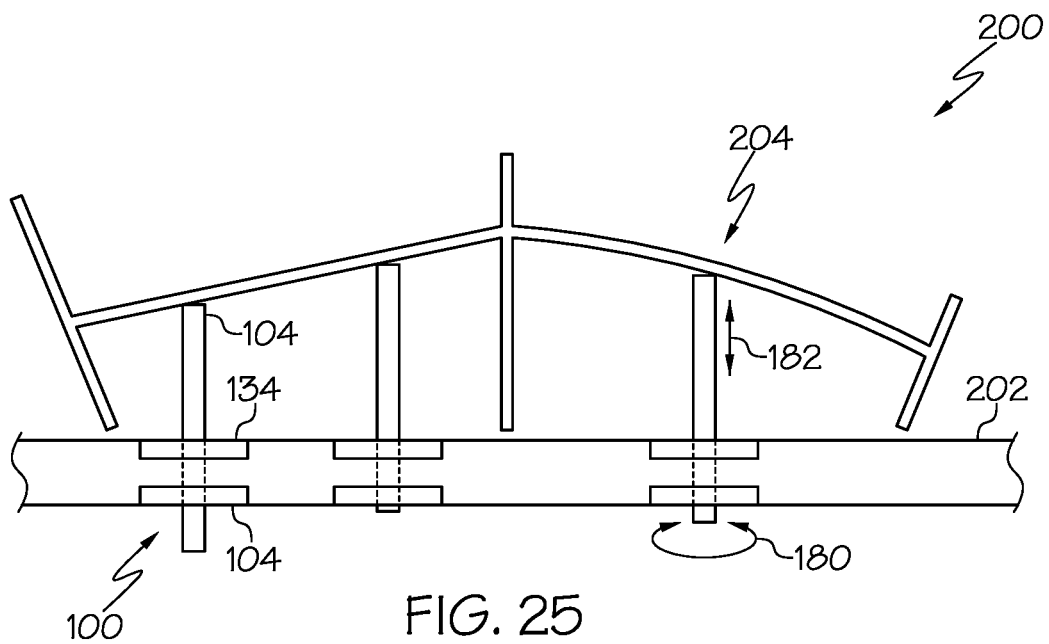
FIG. 25 is a schematic illustration of an example of the adaptive tooling fixture.
Figure 26:
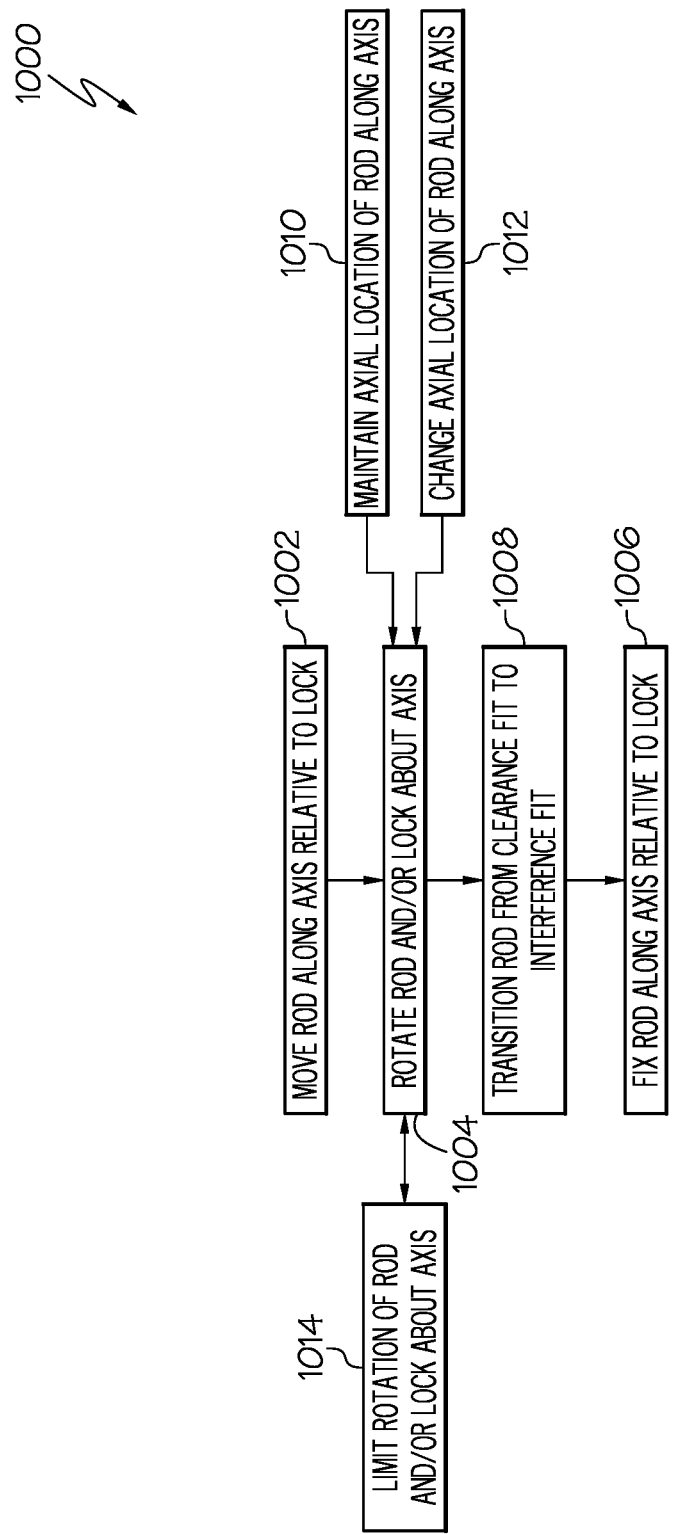
FIG. 26 is a flow diagram of an example of a method for supporting a workpiece.

Referring to FIGS. 1-26, by way of examples, the present disclosure is directed to an axial locking mechanism 100. Referring to FIGS. 1 and 12-15, by way of examples, the present disclosure is also directed to an adaptive tooling fixture 200 that utilizes a plurality of the axial locking mechanisms 100 to support a workpiece. Referring to FIG. 26, by way of examples, the present disclosure is further directed to a method 1000 for supporting the workpiece 204. Examples of the method 1000 are implemented using one or more of the axial locking mechanisms 100 or the adaptive tooling fixture 200.

As described herein, the adaptive tooling fixture 200 and, more particularly, the axial locking mechanism 100 are used to provide a position adjustable, rigid support for a workpiece 204. In an unlocked state 144, the axial locking mechanism 100 enables a support member to be selectively located to support the workpiece 204. In a locked state 146, the axial locking mechanism 100 enables the support member to be fixed at the selected location. Of particular advantage, the axial locking mechanism 100 utilizes a locking action that does not add any additional load on the workpiece 204 when the axial locking mechanism 100 transitions from the unlocked state 144 to the locked state 146.

Figure 1:
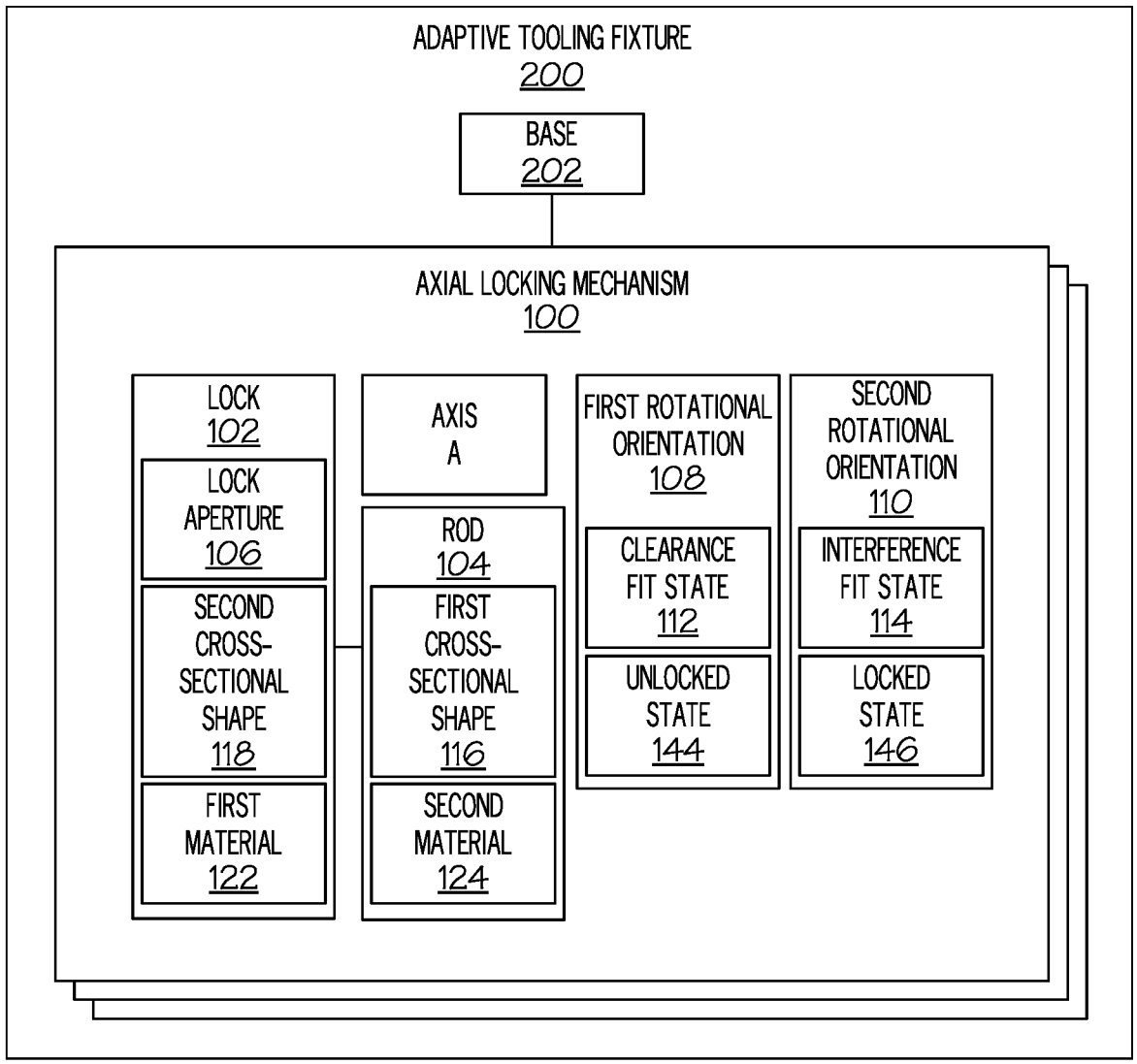
FIG. 1 is a schematic block diagram of an example of an adaptive tooling fixture with axial locking mechanisms.

Referring to FIG. 1, in one or more examples, the axial locking mechanism 100 includes a lock 102 and a rod 104. Interaction between the lock 102 and the rod 104 at different relative rotational orientations facilitates the locking action that restricts axial motion of the rod 104. Generally, the rod 104 is or serves as a support member that physically supports (e.g., holds up, bears the weight of, or otherwise braces) the workpiece 204, such as during a manufacturing operation. The lock 102 is or serves as a securing member that operates to selectively prevent axial movement of the rod 104 relative to the lock 102.

In one or more examples, the lock 102 includes a lock aperture 106. The axial locking mechanism 100 also includes an axis A. The axis A passes through the lock aperture 106 of the lock 102. The rod 104 is receivable by (e.g., within) the lock aperture 106 along the axis A. With the rod 104 received by the lock aperture 106 of the lock 102, the axis A passes through the rod 104. In a first rotational orientation 108 about the axis A, the rod 104 is movable within the lock aperture 106 along the axis A and relative to the lock 102. In a second rotational orientation 110 about the axis A, the rod 104 is fixed within the lock aperture 106 along the axis A and relative to the lock 102.

The locking action of the axial locking mechanism 100 is achieved by physical engagement or physical interference between interfacing, contact surfaces of the lock 102 and the rod 104. With the rod 104 received within the lock aperture 106 of the lock 102, at least one of the lock 102 and the rod 104 is rotatable about the axis A between the first rotational orientation 108 and the second rotational orientation 110. Rotational movement of the rod 104 and the lock 102 relative to each other alternates the axial locking mechanism 100 between the unlocked state 144 and the locked state 146. With the axial locking mechanism 100 in the first rotational orientation 108 and, thus, in the unlocked state 144, the rod 104 is freely movable along the axis A, within the lock aperture 106, and relative to the lock 102. Moving the rod 104 along the axis A and relative to the lock 102 enables the rod 104 to be suitably positioned relative to the lock 102 and/or the workpiece 204, as desired, to support the workpiece 204. With the axial locking mechanism 100 in the second rotational orientation 110 and, thus, in the locked state 146, the rod 104 is fixed along the axis A, within the lock aperture 106, and relative to the lock 102. Fixing the rod 104 along the axis A and relative to the lock 102 enables the rod 104 to be securely held at the selected position to support the workpiece 204 and to be supported by the lock 102. As used herein, the terms "fixed," "fixing," and like terms and phrases refer to a temporary state of connection and motion. For example, the rod 104 being fixed along the axis A means that the rod 104 and the lock 102 are connected and that axial motion of the rod 104 along the axis A and relative to the lock 102 is restricted or prevented under normal operating conditions or under normal loading conditions.

For the purpose of the present disclosure, the first rotational orientation 108 refers to a rotational orientation of the lock 102 relative to the rod 104, a rotational orientation of the rod 104 relative to the lock 102, or both. Similarly, the second rotational orientation 110 refers to a rotational orientation of the lock 102 relative to the rod 104, a rotational orientation of the rod 104 relative to the lock 102, or both.

As an example, the rod 104 is rotatable about the axis A relative to the lock 102 between the first rotational orientation 108 and the second rotational orientation 110. In these examples, with the rod 104 within the lock aperture 106, the rod 104 rotates about the axis A relative to the lock 102 and the lock 102 remains rotationally fixed about the axis A.

As another example, the lock 102 is rotatable about the axis A relative to the rod 104 between the first rotational orientation 108 and the second rotational orientation 110. In these examples, with the rod 104 within the lock aperture 106, the lock 102 rotates about the axis A relative to the rod 104 and the rod 104 remains rotationally fixed about the axis A.

As yet another example, the lock 102 and the rod 104 are rotatable about the axis A relative to each other between the first rotational orientation 108 and the second rotational orientation 110. In these examples, with the rod 104 within the lock aperture 106, the lock 102 rotates about the axis A relative to the rod 104 and the rod 104 rotates about the axis A relative to the lock 102.

Figure 2:
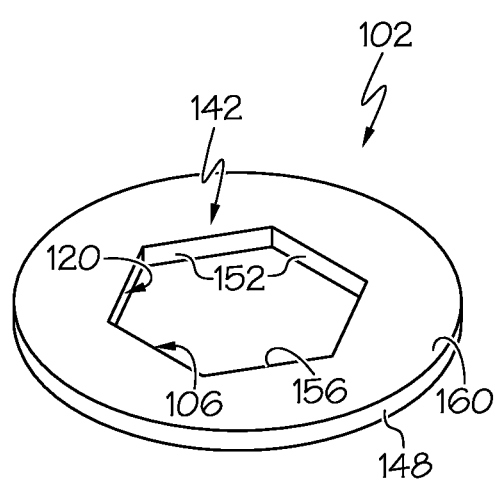
FIG. 2 is a schematic, perspective view of an example of a lock of the axial locking mechanism.

FIG. 2 illustrates an example of the lock 102. In one or more examples, the lock 102 includes a body 148. The lock aperture 106 takes the form of a hole formed through the body 148. In one or more examples, the body 148 is a relatively thin and at least approximately planar member, such as a flat, plate-like member. In one or more examples, the lock aperture 106 is in the approximate middle of the body 148. In one or more examples, the lock 102 is or takes the form of a washer. The body 148 of the lock 102 can have any suitable two-dimensional (e.g., outer perimeter) shape viewed along the axis A. As an example, and as illustrated in FIG. 2, the body 148 is circular or disk-shaped. As another example, the body 148 is square or has another shape.

Figure 3:
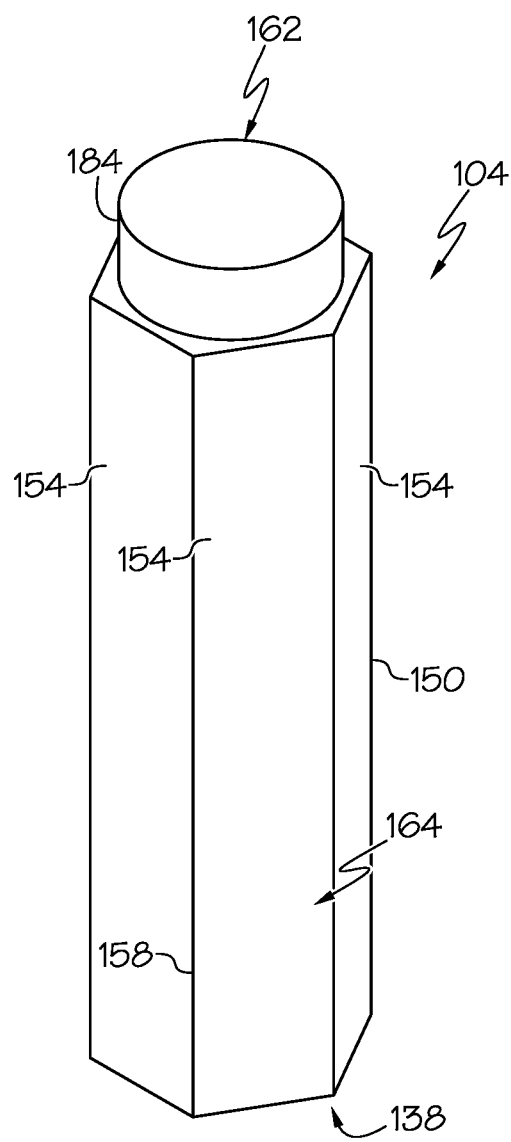
FIG. 3 is a schematic, perspective view of an example of a rod of the axial locking mechanism.

FIGS. 3 and 4 illustrate examples of the rod 104. In one or more examples, the rod 104 includes a shaft 150, a first rod end 138, and a second rod end 162 opposite the first rod end 138 along the axis A. In one or more examples, the shaft 150 is at least approximately straight and relatively slender. At least a portion of the shaft 150 of the rod 104 is suitably sized and shaped to be inserted within and to pass through the lock aperture 106. At least a portion of the shaft 150 of the rod 104 is suitably sized and shaped as to be movable along the axis A when in the first rotational orientation 108. At least a portion of the shaft 150 of the rod 104 is suitably sized and shaped as to become interlocked with the lock 102 when in the second rotational orientation 110.

In one or more examples, rotation of at least one of the rod 104 and the lock 102 about the axis A from the first rotational orientation 108 to the second rotational orientation 110 transitions the rod 104 from a clearance fit state 112 within the lock aperture 106 to an interference fit state 114 within the lock aperture 106. In one or more examples, the clearance fit state 112 achieved in the first rotational orientation 108 refers to an instance in which there is some minimum clearance between a lock surface 142 forming the lock aperture 106 of the lock 102 and a rod surface 164 of the rod 104. For example, in the first rotational orientation 108, a cross-sectional dimension of the rod 104 is less than a cross-sectional dimension of the lock aperture 106 along any virtual line that is perpendicular to the axis A. In one or more examples, the interference fit state 114 achieved in the second rotational orientation 110 refers to an instance in which there is at least a tight fit between the lock surface 142 forming the lock aperture 106 of the lock 102 and the rod surface 164 of the rod 104 that produces a joint that is held together by friction. For example, in the second rotational orientation 110, a cross-sectional dimension of the rod 104 is greater than a cross-sectional dimension of the lock aperture 106 along at least one virtual line that is perpendicular to the axis A.

In one or more examples, the rod 104 has a first cross-sectional shape 116 viewed along the axis A. The first cross-sectional shape 116 of the rod 104 is formed by the rod surface 164. In one or more examples, the rod surface 164 includes one or more rod faces 154. In these examples, one or more of the rod faces 154 is at least approximately flat. However, in other examples, one or more of the rod faces 154 can have a contour or curved-shape. In one or more examples, each one of the rod faces 154 is disposed at a non-zero angle relative to a directly adjacent one of the rod faces 154. In one or more examples, the rod surface 164 includes one or more rod edges 158. Each one of the rod edges 158 is formed at an intersection of a directly adjacent pair of the rod faces 154. In one or more examples, each one of the rod faces 154 extends along or is at least approximately parallel to the axis A. In one or more examples, each one of the rod edges 158 extends along or is at least approximately parallel to the axis A.

In one or more examples, the rod surface 164 extends an entirety of a length of the rod 104 (e.g., of the shaft 150). For example, as illustrated in FIG. 3, the rod surface 164 having the first cross-sectional shape 116, formed by the rod faces 154, extends from proximate the second rod end 162 to the first rod end 138. In one or more examples, the rod surface 164 extends a portion of the length of the rod 104. For example. as illustrated in FIG. 4, the rod 104 includes a first rod portion 166 and a second rod portion 168. The rod surface 164 having the first cross-sectional shape 116, formed by the rod faces 154, extends from the second rod end 162 along the first rod portion 166. The second rod portion 168 extends from the first rod portion 166 to the first rod end 138 along the axis A. The second rod portion 168 has a cross-sectional shape and/or size (e.g., dimensions) that are different than that of the first rod portion 166.

In one or more examples, the first rod end 138 of the rod 104 is a working end or supporting end of the rod 104 that is configured or intended to contact or engage the workpiece 204. In one or more examples, the second rod end 162 of the rod 104 is a control end or commanded end of the rod 104. For example, the second rod end 162 of the rod 104 can be engaged and/or manipulated to drive linear motion of the rod 104 along the axis A, relative to the lock 102 and/or to drive rotational motion of the rod 104 about the axis A, relative to the lock 102. In one or more examples, the rod 104 includes a head 184 located at the second rod end 162. The head 184 can be configured to be engaged by a hand tool, a hand of an operator, a machine tool, and the like to control relative motion of the rod 104.

In one or more examples, the lock aperture 106 has a second cross-sectional shape 118 viewed along the axis A. The second cross-sectional shape 118 of the lock aperture 106 is formed by a portion of the lock surface 142. In one or more examples, the lock surface 142 includes one or more lock-aperture faces 152. In one or more examples, the lock 102 includes a continuous side wall 120. Generally, the lock-aperture faces 152 circumscribe the axis A and form the continuous side wall 120. The continuous side wall 120 forms a perimeter of the lock aperture 106. In one or more examples, one or more of the lock-aperture faces 152 is at least approximately flat. However, in other examples, one or more of the lock-aperture faces 152 can have a contour or curved-shape. In one or more examples, each one of the lock-aperture faces 152 is disposed at a non-zero angle relative to a directly adjacent one of the lock-aperture faces 152. In one or more examples, the lock surface 142 includes one or more lock edges 156. Each one of the lock edges 156 is formed at an intersection of a directly adjacent pair of the lock-aperture faces 152 and a lock-body face 160. In one or more examples, each one of the lock-aperture faces 152 extends along or is at least approximately parallel to the axis A. In one or more examples, each one of the lock edges 156 extends about or is at least approximately perpendicular to the axis A. In one or more examples, the lock-body face 160 is at least approximately perpendicular to the axis A.

Generally, it is an interaction between the rod surface 164, having the first cross-sectional shape 116, and the lock surface 142 of the lock aperture 106, having the second cross-sectional shape 118, at different relative rotational orientations of the rod 104 and the lock 102 that creates the locking action of the axial locking mechanism 100. As described above, in one or more examples, in the second rotational orientation 110, a joint is formed between the rod 104 and the lock 102 in which the rod surface 164 and the lock surface 142 are held together by friction.

Referring to FIG. 5, in one or more examples, in the second rotational orientation 110 about the axis A, the rod 104 and the lock 102 physically interfere with each other. In these examples, in the second rotational orientation 110, a joint is formed between the rod 104 and the lock 102 in which one of the rod surface 164 or the lock surface 142 is deformed by intrusion of the other. The rod surface 164 and the lock surface 142 are held together by the mated deformation created. As an example, in the second rotational orientation 110, a portion of the lock surface 142, such as one or more of the lock edges 156 and/or one or more of the lock-aperture faces 152 digs into, cuts into, gouges into, or is otherwise forced into a portion of the rod surface 164, such as one or more of the rod faces 154 or one or more of the rod edges 158. As another example, in the second rotational orientation 110, a portion of the rod surface 164, such as one or more of the rod edges 158 and/or one or more of the rod faces digs into, cuts into, gouges into, or is otherwise forced into a portion of the lock surface 142, such as one or more of the lock-aperture faces 152 and/or one or more of the lock edges 156.

In one or more examples, the lock 102 includes a first material 122. The rod 104 includes a second material 124. In one or more examples, the first material 122 and the second material 124 are different. In these examples, the different materials of construction of the rod 104 and the lock 102 are selected to enable connection of the rod 104 and the lock 102 by physical intrusion and/or mating deformation between the rod 104 and the lock 102. For example, one of the rod 104 or the lock 102 is made of a relatively harder material and the other one of the rod 104 or the lock 102 is made of a relatively softer material.

In one or more examples, the first material 122 (e.g., relatively harder material) of the lock 102 is harder than the second material 124 (e.g., relatively harder material) of the rod 104. In these examples, when rotated in the second rotational orientation 110, the lock 102 physically intrudes into the rod surface 164 of the rod 104.

In one or more examples, the second material 124 (e.g., relatively harder material) of the rod 104 is harder than the first material 122 (e.g., relatively softer material) of the lock 102. In these examples, when rotated in the second rotational orientation 110, the rod 104 physically intrudes into the lock surface 142 of the lock 102.

In one or more examples, the relatively harder material is or includes steel and the relatively softer material is or includes aluminum or another material that is softer than steel. In one or more examples, the relatively harder material is or includes aluminum and the relatively softer material is or includes plastic, rubber, or another material that is softer than aluminum. Other combinations of different relatively harder materials and the relatively softer materials are also contemplated.

Referring to FIG. 1, in one or more examples, the first cross-sectional shape 116 and the second cross-sectional shape 118 are the same. In one or more examples, the first cross-sectional shape 116 and the second cross-sectional shape 118 are different. In one or more examples, the first cross-sectional shape 116 and the second cross-sectional shape 118 are complementary. In one or more examples, the first cross-sectional shape 116 and the second cross-sectional shape 118 are symmetric. In one or more examples, the first cross-sectional shape 116 and the second cross-sectional shape 118 are asymmetric.

FIGS. 6-15 illustrate examples of the axial locking mechanism 100. FIGS. 6, 8, 10, 12 and 14 illustrate examples of the axial locking mechanism 100 with the rod 104 and the lock 102 in the first rotational orientation 108 relative to each other. As illustrated, in the first rotational orientation 108, the rod 104 and the lock 102 are in the unlocked state 144 or the clearance fit state 112. FIGS. 7, 9, 11, 13 and 15 illustrate examples of the axial locking mechanism 100 with the rod 104 and the lock 102 in the second rotational orientation 110 relative to each other. In the second rotational orientation 110, the rod 104 and the lock 102 are in the locked state 146 or the interference fit state 114.

Figure 7:
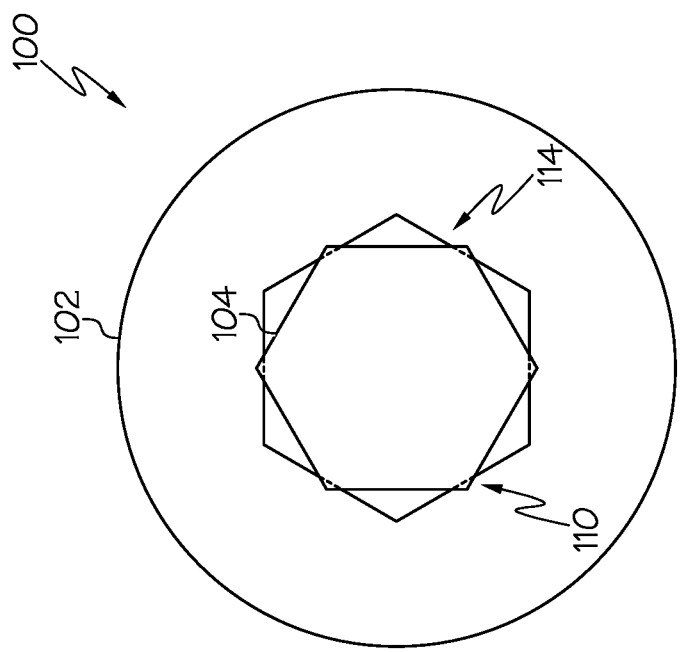
FIG. 7 is a schematic, plan view of an example of the axial locking mechanism of FIG. 6 in a locked state.
Figure 6:
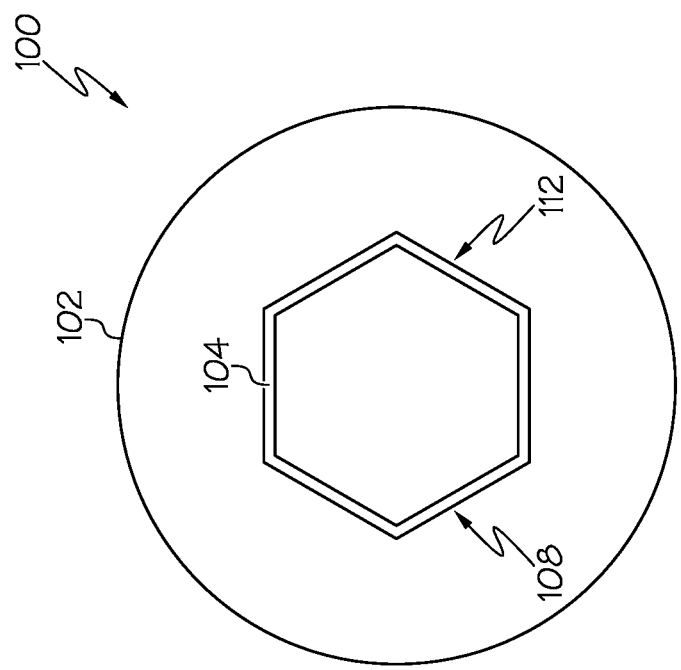
FIG. 6 is a schematic, plan view of an example of the axial locking mechanism in an unlocked state.

Referring to FIGS. 6 and 7, in one or more examples, the first cross-sectional shape 116 and the second cross-sectional shape 118 are polygons. In one or more examples, the first cross-sectional shape 116 and the second cross-sectional shape 118 are a hexagon (e.g., shown in FIGS. 6 and 7). In other examples, the first cross-sectional shape 116 and the second cross-sectional shape 118 can have any other polygonal shape, such as triangular, square, octagonal, etc. As such, the rod 104 and the lock 102 can have any suitable number of rod faces 154 and lock-aperture faces 152, respectively.

Figure 8:
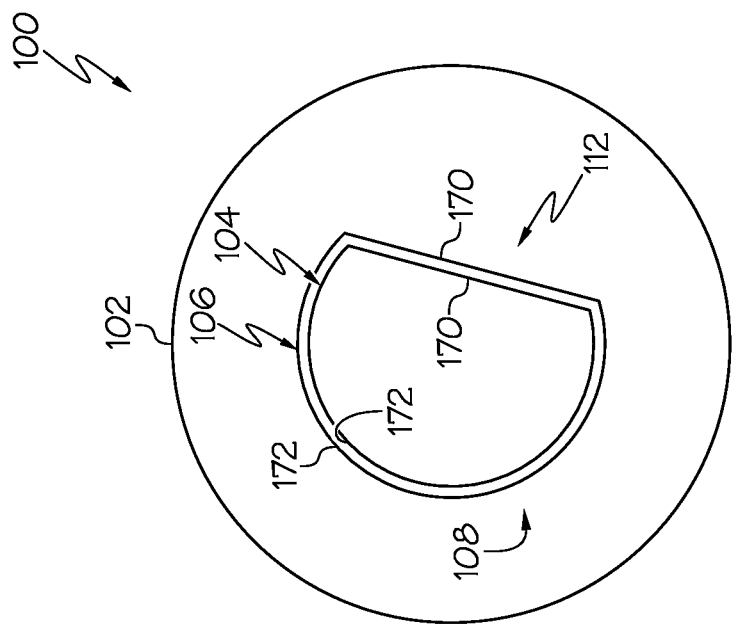
FIG. 8 is a schematic, plan view of an example of the axial locking mechanism in an unlocked state.
Figure 9:
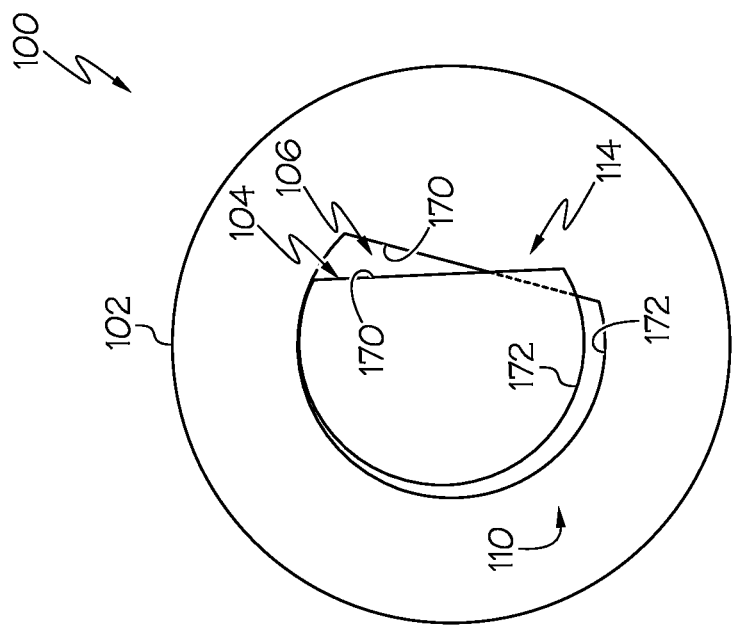
FIG. 9 is a schematic, plan view of an example of the axial locking mechanism of FIG. 8 in a locked state.

Referring to FIGS. 8 and 9, in one or more examples, the first cross-sectional shape 116 and the second cross-sectional shape 118 are irregular shapes. As an example, the first cross-sectional shape 116 and the second cross-sectional shape 118 can include a cam-like shape, for example, having at least one flat portion 170 (e.g., a flat face) and at least one curved portion 172 (e.g., a curved face).

Figure 11:
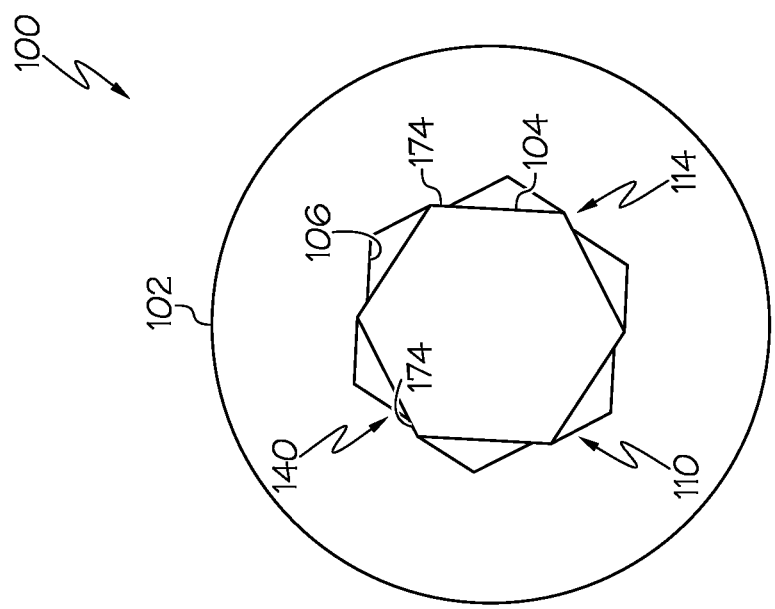
FIG. 11 is a schematic, plan view of an example of the axial locking mechanism of FIG. 10 in a locked state.
Figure 10:
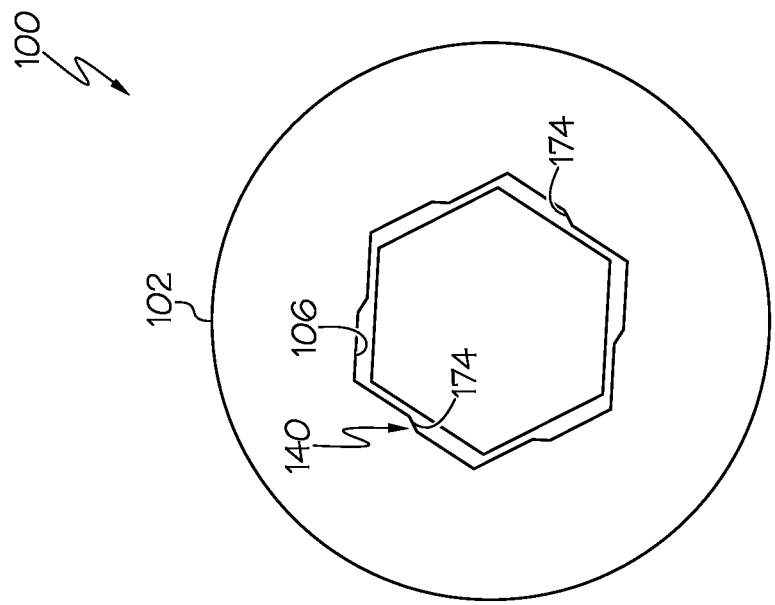
FIG. 10 is a schematic, plan view of an example of the axial locking mechanism in an unlocked state.
Figure 13:
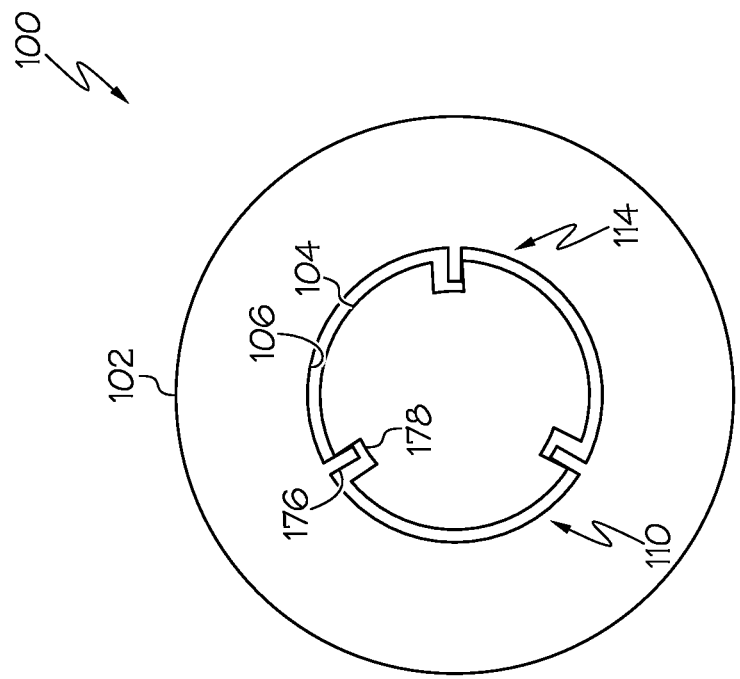
FIG. 13 is a schematic, plan view of an example of the axial locking mechanism of FIG. 12 in a locked state.
Figure 12:
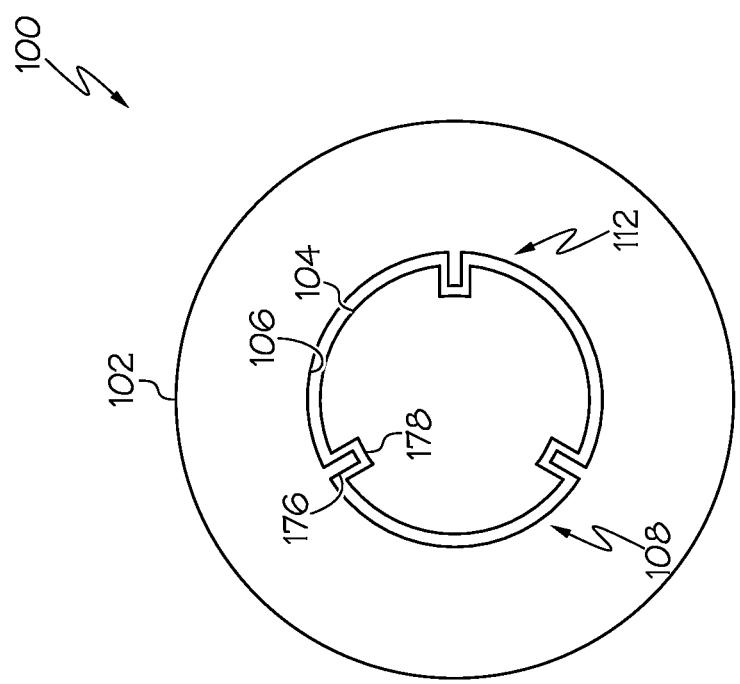
FIG. 12 is a schematic, plan view of an example of the axial locking mechanism in an unlocked state.
Figure 15:
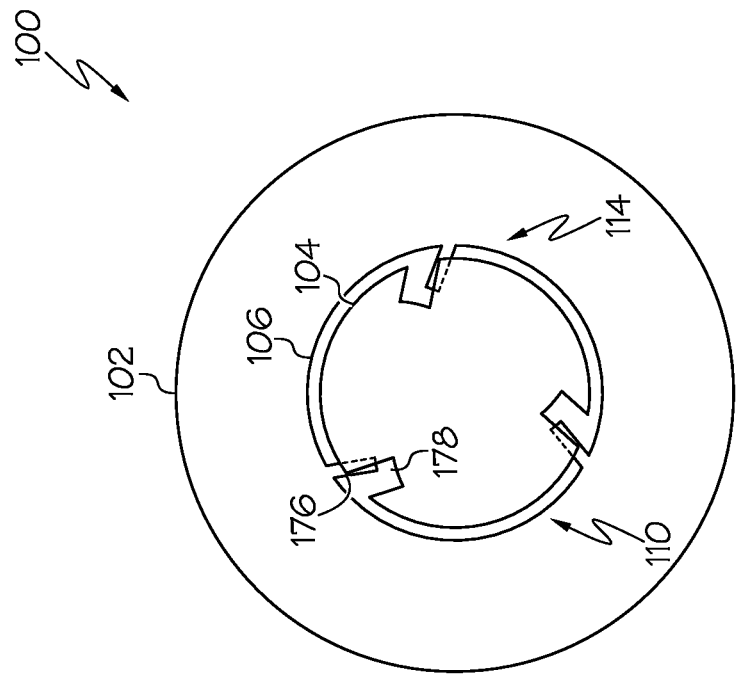
FIG. 15 is a schematic, plan view of an example of the axial locking mechanism of FIG. 14 in a locked state.
Figure 14:
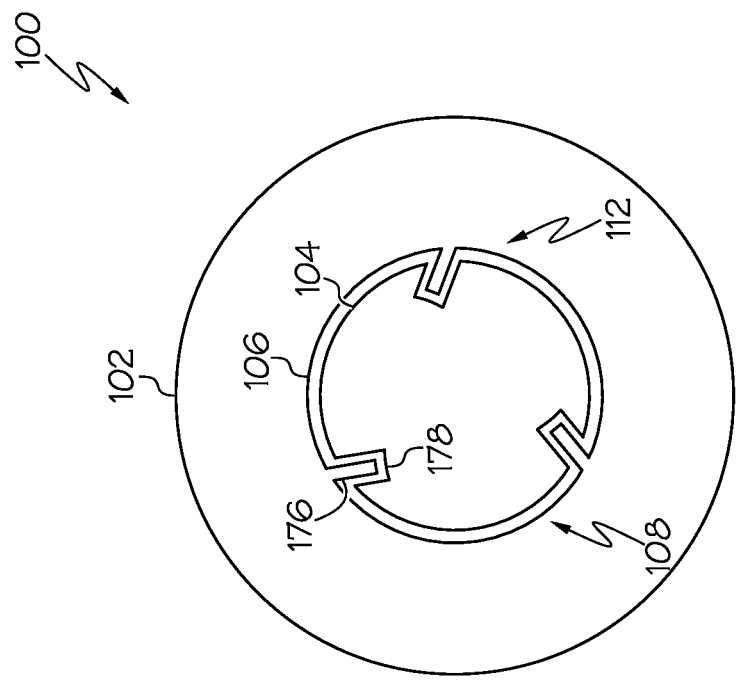
FIG. 14 is a schematic, plan view of an example of the axial locking mechanism in an unlocked state.

Referring to FIGS. 10 and 11, in one or more examples, the lock 102 includes a stop 140. With the rod 104 within the lock aperture 106, the stop 140 limits rotation of the rod 104 about the axis A relative to the lock 102 limits rotations of the lock 102 about the axis A relative to the rod 104. In one or more examples, the stop 140 includes or is formed by one or more notches 174. Each one of the notches 174 projects from a corresponding one of the lock-aperture faces 152 or is otherwise formed by an indentation formed along the corresponding one of the lock-aperture faces 152. Generally, a face or an edge of the notch 174 forms a hard stop that limits rotational motion of the rod 104 and the lock 102 relative to each other.

Referring to FIGS. 12-15, in one or more examples, the one of the rod 104 or the lock 102 includes one or more protrusions 176 projecting radially (e.g., inward or outward, respectively) and the other one of the rod 104 or the lock 102 includes one or more recesses 178 depending radially (e.g., outward or inward, respectively). Generally, the protrusions 176 and the recesses 178 have complementary and matching shapes such that, when in the first rotational orientation 108

(FIGS. 12 and 14), the protrusions 176 are received within the recesses 178 without restricting axial motion of the rod 104 along the axis A.

Figure 16:
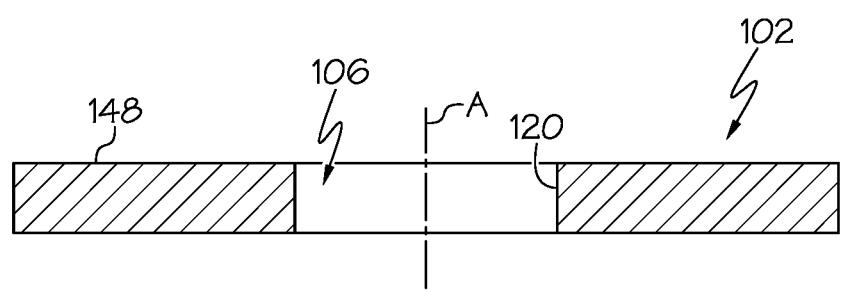
FIG. 16 is a schematic, section view of an example of the lock of the axial locking mechanism.

Referring to FIG. 16, in one or more examples, the continuous side wall 120 of the lock 102, forming the lock aperture 106, is parallel to the axis A (e.g., to a plane that is parallel to the axis A). In these examples, an axial location of the rod 104 along the axis A remains fixed during rotational motion about the axis A from the first rotational orientation 108 to the second rotational orientation 110. Preventing axial movement of the rod 104 along the axis A during locking of the axial locking mechanism 100 advantageously prevents application of an undesirable load (e.g., pre-load) on the workpiece 204 during the supporting process.

Figure 17:
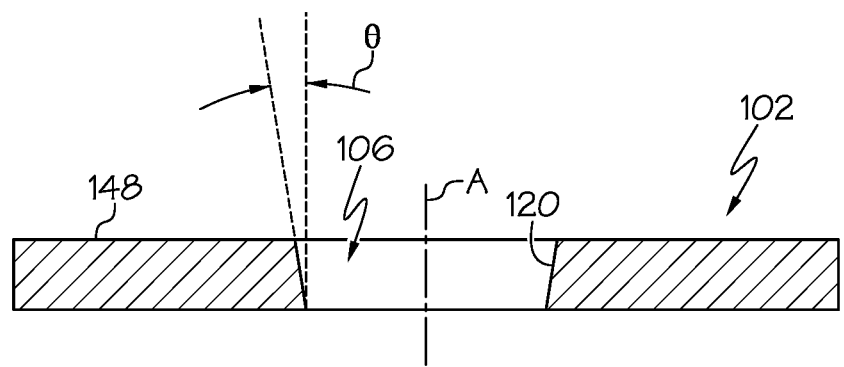
FIG. 17 is a schematic, section view of an example of the lock of the axial locking mechanism.

Referring to FIG. 17, in one or more examples, the continuous side wall 120 is orientated at an oblique angle θ relative to the axis A (e.g., to a plane that is parallel to the axis A). In these examples, an axial location of the rod 104 along the axis A changes during rotational motion about the axis A from the first rotational orientation 108 to the second rotational orientation 110. In one or more examples, the amount (e.g., distance) of axial movement of the rod 104 along the axis A can be selected or tailored to a predetermined, expected, or desired amount based on the angle θ. In certain applications, a small degree of controlled axial motion of the rod 104 along the axis A (e.g., toward the workpiece 204 or away from the workpiece 204) is desirable or advantageous.

Figure 18:
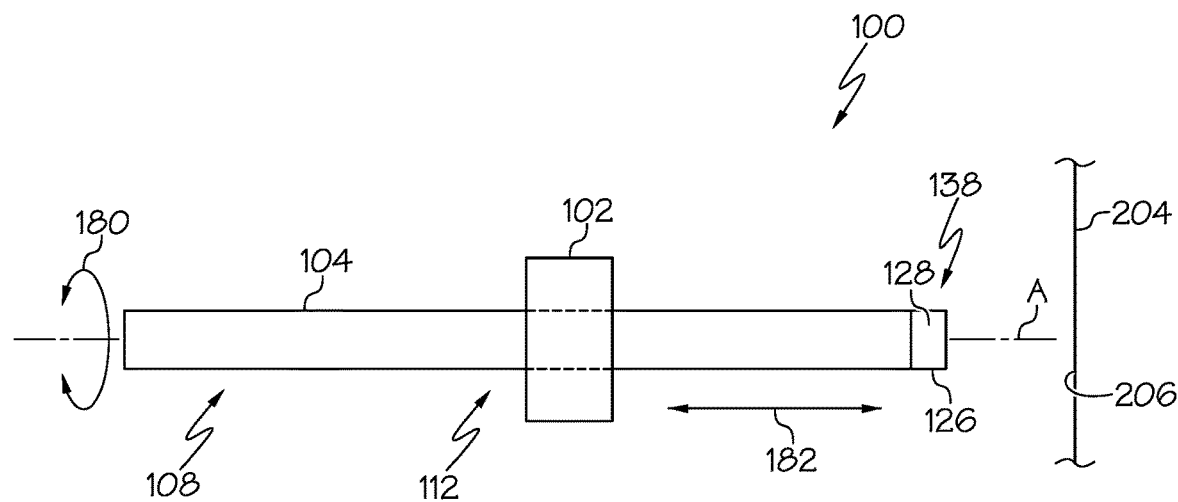
FIG. 18 is a schematic illustration of an example of the axial locking mechanism in an unlocked state.
Figure 19:
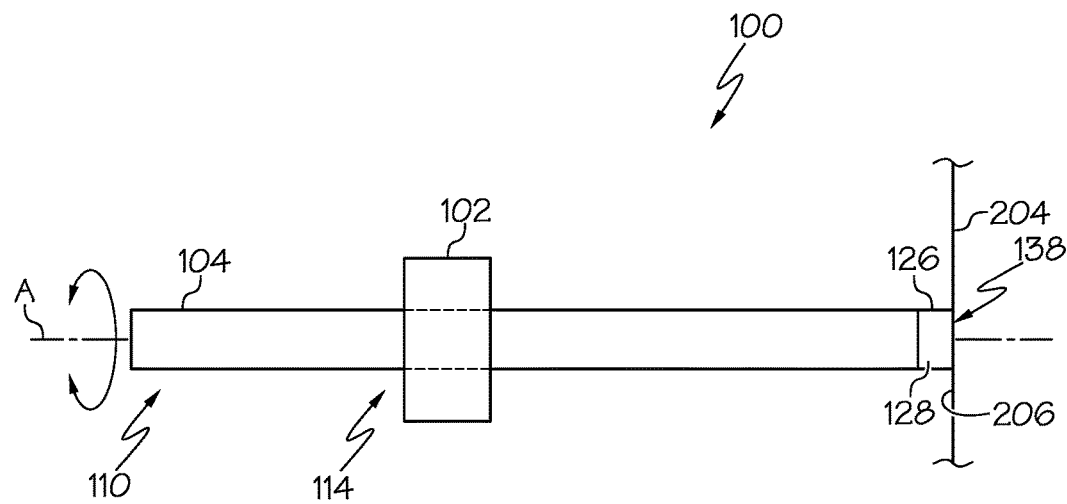
FIG. 19 is a schematic illustration of an example of the axial locking mechanism in a locked state.

FIGS. 18 and 19 illustrate an example of the axial locking mechanism 100 being used to support a portion of the workpiece 204. FIG. 18 illustrate an example of the axial locking mechanism 100 with the rod 104 and the lock 102 in the first rotational orientation 108 relative to each other. As illustrated, in the first rotational orientation 108, the rod 104 and the lock 102 are in the unlocked state 144 or the clearance fit state 112. At least one of the rod 104 and the lock 102 are rotatable about the axis A relative to each other (e.g., in the directions of rotational directional arrow 180). In the first rotational orientation 108, the rod 104 is linearly movable along the axis A relative to the lock 102 (e.g., in the directions of linear directional arrow 182) to position the first rod end 138 of the rod 104 into contact with a workpiece surface 206 of the workpiece 204 (e.g., as shown in FIG. 19). FIG. 19 illustrate an example of the axial locking mechanism 100 with the rod 104 and the lock 102 in the second rotational orientation 110 relative to each other. As illustrated, in the second rotational orientation 110, the rod 104 and the lock 102 are in the locked state 146 or the interference fit state 114. With the rod 104 linearly moved along the axis A relative to the lock 102 into contact with the workpiece surface 206 of the workpiece 204, at least one of the rod 104 and the lock 102 is rotated about the axis A relative to each other (e.g., in the directions of rotational directional arrow 180) from the first rotational orientation 108 to the second rotational orientation 110.

In one or more examples, the axial locking mechanism 100 includes a cushion 126. The cushion 126 is located on the first rod end 138 of the rod 104. The cushion 126 is configured to engage the workpiece surface 206. In one or more examples, the axial locking mechanism 100 includes an adhesive 128. In one or more examples, the adhesive 128 is located on the first rod end 138 of the rod 104. In one or more examples, the adhesive 128 is located on or over the cushion 126. In one or more examples, the adhesive 128 is or forms the cushion 126. In one or more examples, the adhesive 128 is an epoxy.

Figure 20:
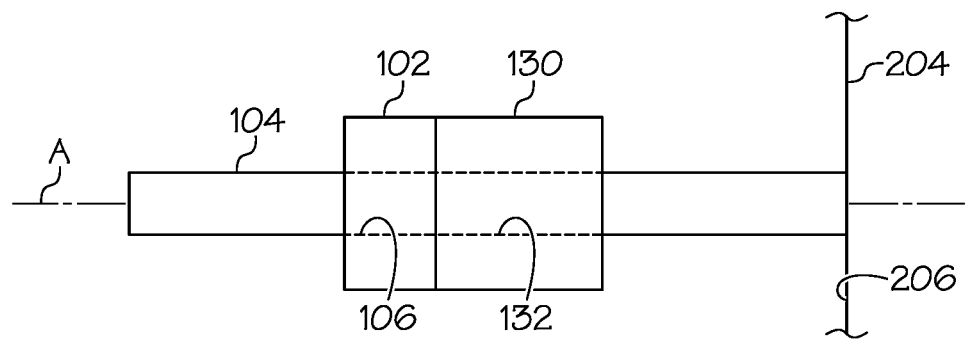
FIG. 20 is a schematic illustration of an example of the axial locking mechanism.

Referring to FIG. 20, in one or more examples, the axial locking mechanism 100 includes a guide 130. The guide 130 includes a guide aperture 132. The axis A passes through the guide aperture 132. The rod 104 is receivable by the guide aperture 132 along the axis A. The guide 130 assists with and directs axial motion of the rod 104 along the axis A relative to the lock 102 and the guide 130. As an example, the guide 130 maintains the rod 104 parallel with or coincident with the axis A during axial motion. In one or more examples, the guide 130 is a tubular element with a hollow core that forms the guide aperture 132.

Figure 21:
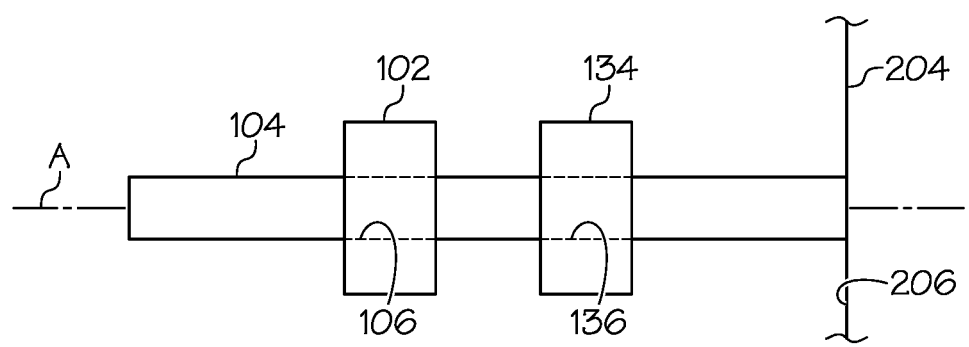
FIG. 21 is a schematic illustration of an example of the axial locking mechanism.
Figure 22:
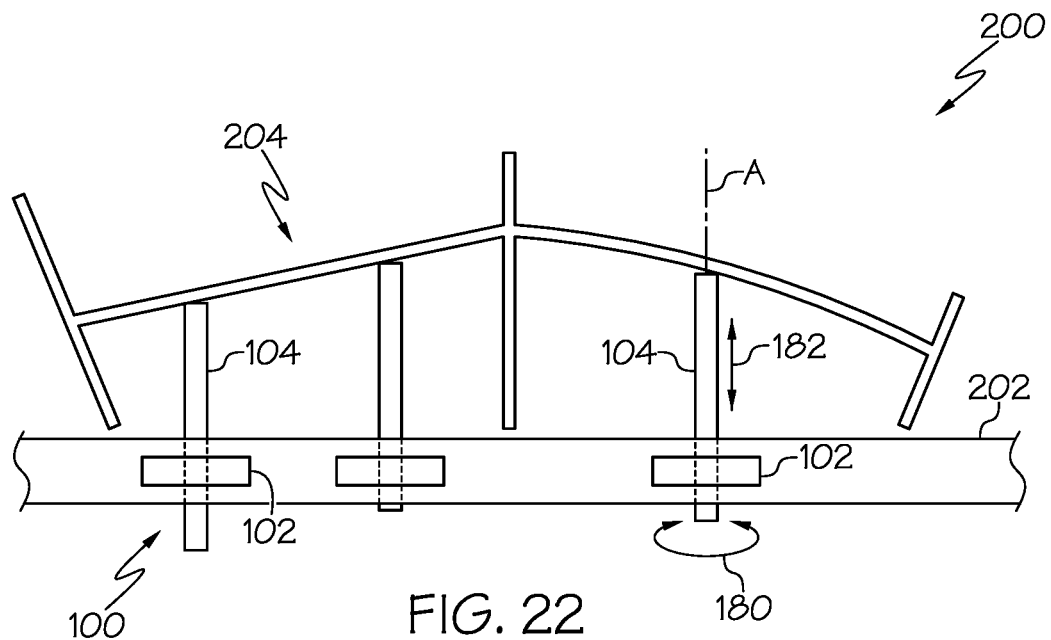
FIG. 22 is a schematic illustration of an example of the adaptive tooling fixture that utilizes a plurality of the axial locking mechanisms.

Referring to FIG. 21, in one or more examples, the axial locking mechanism 100 includes a second lock 134. The second lock 134 includes a second lock aperture 136. The axis A passes through the second lock aperture 136. The second lock 134 is spaced apart from the lock 102 along the axis A. The rod 104 is receivable by the second lock aperture 136 along the axis A. In the first rotational orientation 108 about the axis A, the rod 104 is movable within the second lock aperture 136 along the axis A and relative to the second lock 134. In the second rotational orientation 110 about the axis A, the rod 104 is fixed within the second lock aperture 136 along the axis A and relative to the second lock 134.

Generally, the second lock 134 performs in substantially the same manner as the lock 102. In one or more examples, the second lock 134 serves as a backup or redundancy for the lock 102. In one or more examples, physical interference or intrusion of the second lock 134 with the rod 104 provides additional locking forces to support the workpiece 204 or otherwise react to loading of the rod 104 from the first rod end 138.

Referring again to FIG. 1, in one or more examples, the adaptive tooling fixture 200 includes a base 202. The adaptive tooling fixture 200 also includes a plurality of the axial locking mechanisms 100. Each one of the axial locking mechanisms 100 is coupled to the base 202. Each one of the axial locking mechanisms 100 includes the lock 102 and the rod 104. In the first rotational orientation 108 about the axis A, the rod 104 is movable within the lock aperture 106 along the axis A and relative to the lock 102. In the second rotational orientation 110 about the axis A, the rod 104 is fixed within the lock aperture 106 along the axis A and relative to the lock 102.

FIGS. 22-25 illustrate examples of the adaptive tooling fixture 200 supporting the workpiece 204 using a plurality of the axial locking mechanisms 100. In one or more examples, the lock 102 of the axial locking mechanism 100 is coupled to or is otherwise embedded within the base 202. In the unlocked state 144, the rod 104 of the axial locking mechanism 100 is linearly movable along the axis A relative to the lock 102 and the base 202 to position the first rod end 138 into contact with the workpiece 204. With the rod 104 of each one of the axial locking mechanisms 100 in contact with and supporting the workpiece 204, the axial locking mechanisms 100 are placed in the locked state 146. In one or more examples, the rod 104 is rotationally movable about the axis A relative to the lock 102 and the base 202 from the first rotational orientation 108 to the second rotational orientation 110. In one or more examples, the lock 102 is rotationally movable about the axis A relative to the rod 104 and the base 202 from the first rotational orientation 108 to the second rotational orientation 110.

Figure 23:
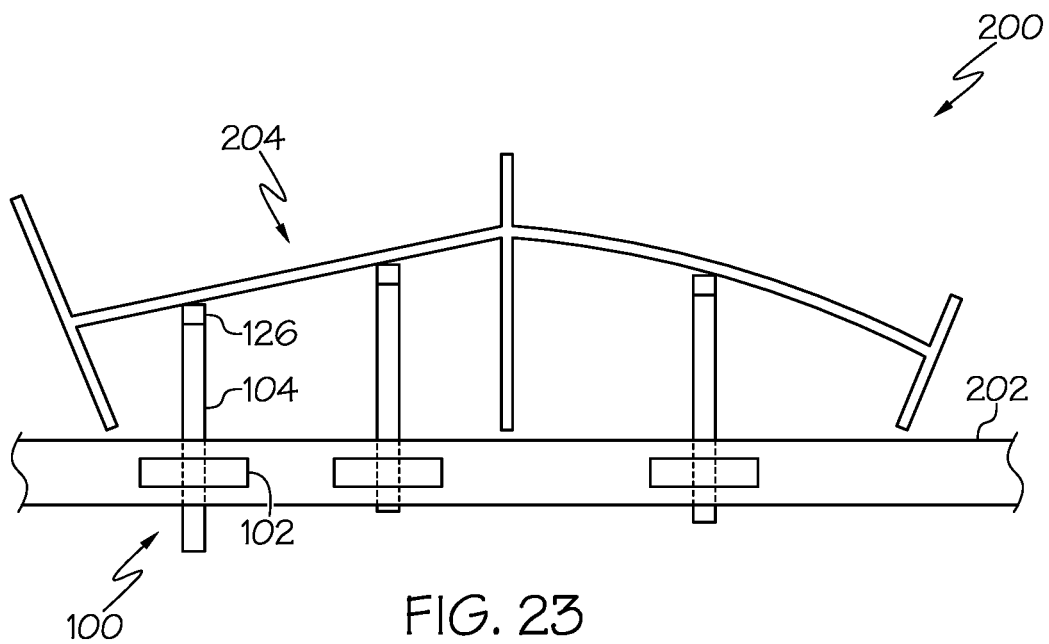
FIG. 23 is a schematic illustration of an example of the adaptive tooling fixture.
Figure 24:
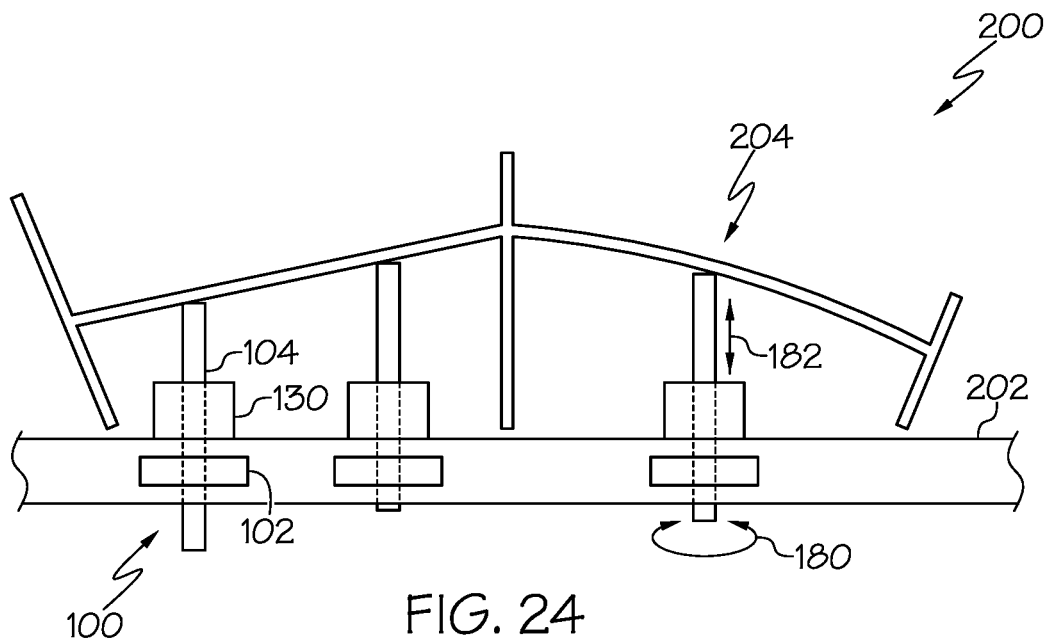
FIG. 24 is a schematic illustration of an example of the adaptive tooling fixture.

FIG. 23 illustrates an example of the adaptive tooling fixture 200 in which one or more of the axial locking mechanisms 100 includes the cushion 126, such as the adhesive 128. FIG. 24 illustrates an example of the adaptive tooling fixture 200 in which one or more of the axial locking mechanisms 100 includes the guide 130. In one or more examples, the guide 130 of each one of the axial locking mechanisms 100 is coupled to the base 202. FIG. 25 illustrates an example of the adaptive tooling fixture 200 in which one or more of the axial locking mechanisms 100 includes the second lock 134. In one or more examples, the second lock 134 of each one of the axial locking mechanisms 100 is coupled to the base 202.

Referring to FIG. 26, in one or more examples, the method 1000 includes a step of (block 1002) in a first rotational orientation 108, moving the rod 104 along the axis A within the lock aperture 106 of the lock 102 until the first rod end 138 of the rod 104 is in contact with the workpiece 204. The method 1000 includes a step of (block 1004) rotating at least one of the rod 104 and the lock 102 about the axis A to a second rotational orientation 110. The method 1000 includes a step of (block 1006) in the second rotational orientation 110, fixing the rod 104 along the axis A within the lock aperture 106.

In one or more examples, the method 1000 includes a step of (block 1008) transitioning the rod 104 from the clearance fit state 112 to the interference fit state 114 within the lock aperture 106. In one or more examples, the step of (block 1004) rotating at least one of the rod 104 and the lock 102 about the axis A from the first rotational orientation 108 to the second rotational orientation 110 results in the step of (block 1008) transitioning the rod 104 from the clearance fit state 112 to the interference fit state 114 within the lock aperture 106. In these examples, the step of (block 1008) transitioning results in the step of (block 1006) fixing the rod 104 along the axis A within the lock aperture 106.

In one or more examples, the method 1000 includes a step of (block 1010) maintaining an axial location of the rod 104 along the axis A during the step of (block 1004) rotating the rod 104 about the axis A.

In one or more examples, the method 1000 includes a step of (block 1012) changing an axial location of the rod 104 along the axis A during the step of (block 1004) rotating the rod 104 about the axis A.

In one or more examples, the method 1000 includes a step of (block 1014) limiting rotation of at least one of the rod 104 and the lock 102 about the axis A relative to each other.

Accordingly, examples of the axial locking mechanism 100 described herein provide a rigid support that contacts the workpiece 204 but that does not add additional loads on the workpiece (e.g., does not "push" on the workpiece when locked in a fixed axial position). In some examples, the axial locking mechanism 100 includes a fixed washer with a hexagonal shaped orifice (e.g., hex-washer) and a hexagonal rod (e.g., hex-rod) with an adhesive on a distal end. The rod is capable of sliding in or out of the fixed washer and is made from a softer material than the washer. One particularly advantageous feature is that the locking action does not move the rod in the axial direction. In other words, once positioned, the locking action will not cause a change in that position to avoid unknown loads on the workpiece. In some examples, the hex-washer is mounted to a fixture plate of the adaptive tooling fixture 200. In some examples, the hex-washer orifice geometry can be modified with notch features to prevent the hex-rod from over rotating while locking. In some examples, including a slight taper to the hex-washer orifice can induce a slight known displacement during locking, which can be useful to ensure that the hex-rod always pulls away from the workpiece surface during locking (e.g., by approximately 0.003 inch) and ensure it will not push the workpiece. Thus, the axial locking mechanism 100 provides a low cost, adjustable rigid support for a wide range of part geometries.

Figure 27:
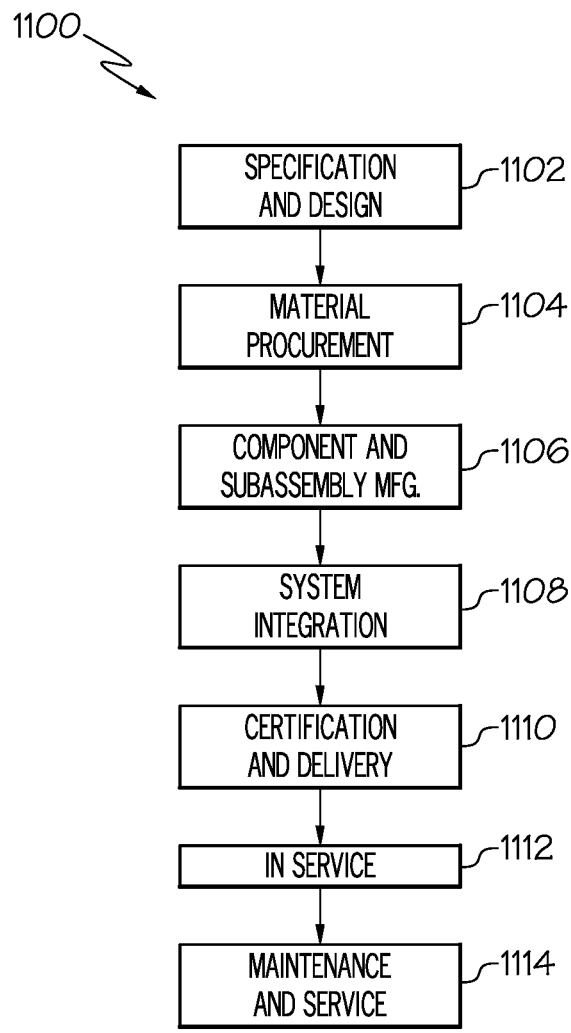
FIG. 27 is a flow diagram of an example of an aircraft manufacturing and service method.
Figure 28:
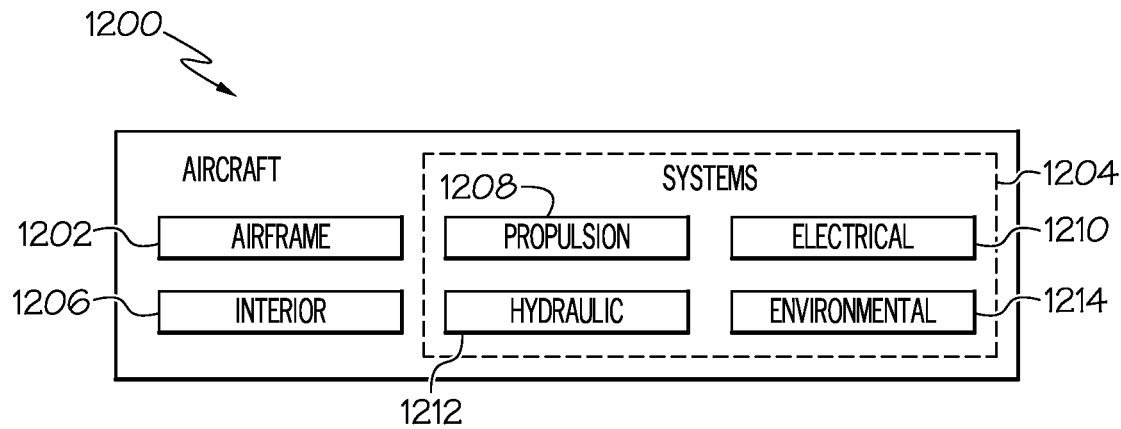
FIG. 28 is a schematic block diagram of an example of an aircraft.

Referring now to FIGS. 27 and 28, examples of the axial locking mechanism 100, the adaptive tooling fixture 200, and the method 1000 described herein, may be related to, or used in the context of, an aircraft manufacturing and service method 1100, as shown in the flow diagram of FIG. 27 and the aircraft 1200, as schematically illustrated in FIG. 28. For example, the aircraft 1200 and/or the aircraft production and service method 1100 may include the workpiece 204 that was supported during manufacture by the axial locking mechanism 100 or the adaptive tooling fixture 200 and/or according to the method 1000.

Referring to FIG. 28, which illustrates an example of the aircraft 1200. The aircraft 1200 includes an airframe 1202 having an interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to an airframe 1202 of the aircraft 1200, such as for example, flaps, spoilers, ailerons, slats, rudders, elevators, and trim tabs. In yet other examples, the onboard systems 1204 also includes one or more other systems, such as, but not limited to, communications systems, avionics systems, software distribution systems, network communications systems, passenger information/entertainment systems, guidance systems, radar systems, weapons systems, and the like. The aircraft 1200 may include various other structures made using the workpiece 204 that was supported during manufacture by the axial locking mechanism 100 or the adaptive tooling fixture 200 and/or according to the method 1000.

Referring to FIG. 27, during pre-production of the aircraft 1200, the manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the manufacturing and service method 1100 illustrated in FIG. 27 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the axial locking mechanism 100, the adaptive tooling fixture 200, and/or the method 1000 shown and described herein, may be employed during any one or more of the stages of the manufacturing and service method 1100 shown in the flow diagram illustrated by FIG. 27. In an example, support the workpiece 204 during manufacture using the axial locking mechanism 100 or the adaptive tooling fixture 200 and/or according to the method 1000 may form a portion of component and subassembly manufacturing (block 1106) and/or system integration (block 1108).

Further, workpieces 204 supported during manufacture using the axial locking mechanism 100 or the adaptive tooling fixture 200 and/or according to the method 1000 may be implemented in a manner similar to components or subassemblies prepared while the aircraft 1200 is in service (block 1112). Also, workpieces 204 supported during manufacture using the axial locking mechanism 100 or the adaptive tooling fixture 200 and/or according to the method 1000 may be utilized during system integration (block 1108) and certification and delivery (block 1110). Similarly, workpieces 204 supported during manufacture using the axial locking mechanism 100 or the adaptive tooling fixture 200 and/or according to the method 1000 may be utilized, for example and without limitation, while the aircraft 1200 is in service (block 1112) and during maintenance and service (block 1114).

Herein is also disclosed a precision machined wear plate that encompasses a hybrid work-holding solution. The hybrid work-holding solution adapts to hold, locate, and support any freeform shape with no additional engineering, design, or manufacturing. The disclosure herein relates to work-holding supports that provide adaptive positioning, quick connect and disconnecting with standard industry tools. Herein is disclosed a wear plate for work-holding to enable model-based engineering. Herein is disclosed a method for enabling model-based engineering. Individually designed models or prototypes can be held, located, and supported by the wear plate of the illustrative examples.

Figure 29:
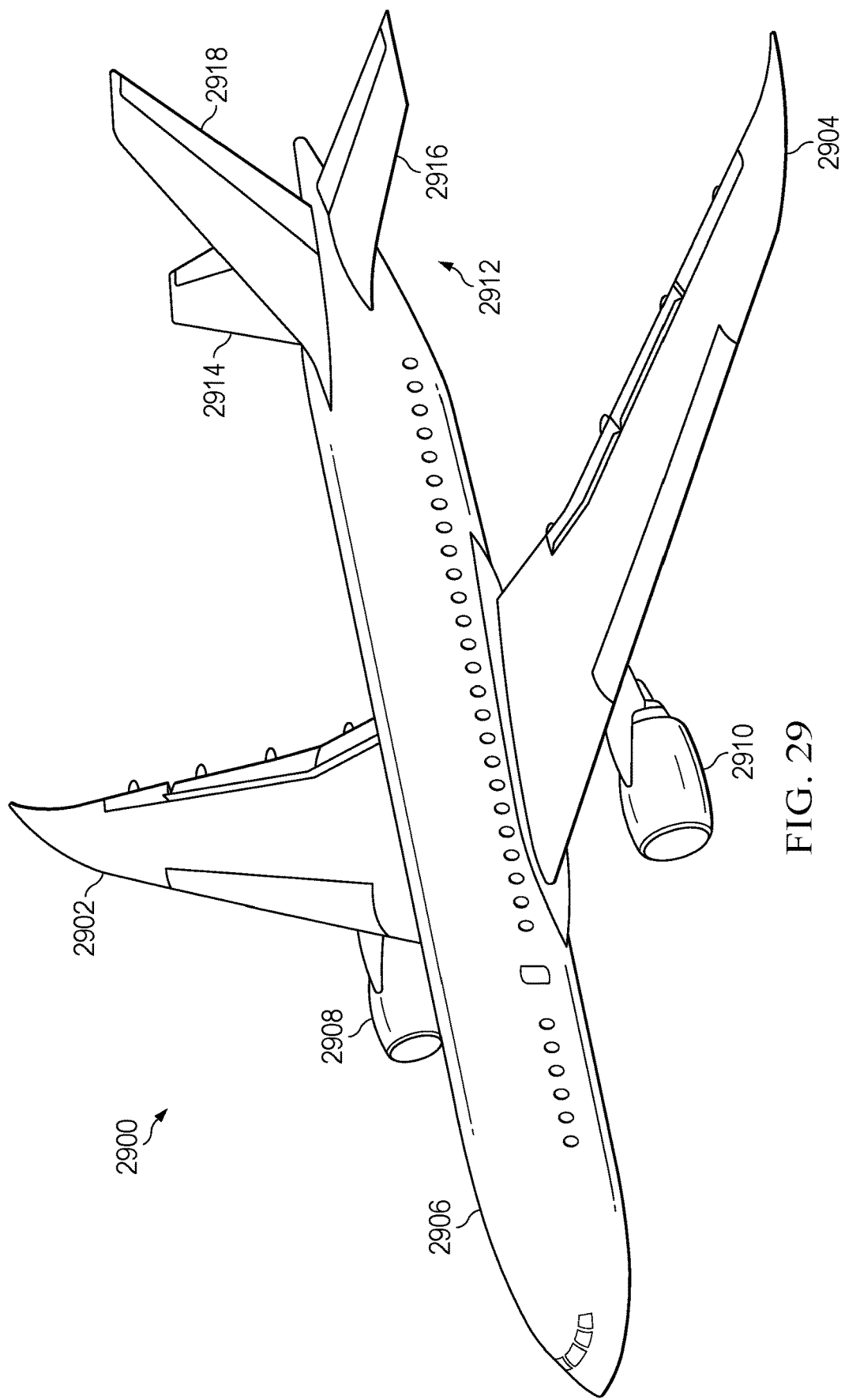
FIG. 29 is a is an illustration of an aircraft in accordance with an illustrative embodiment.

Turning now to FIG. 29, an illustration of an aircraft is depicted in accordance with an illustrative embodiment. Aircraft 2900 has wing 2902 and wing 2904 attached to body 2906. Aircraft 2900 includes engine 2908 attached to wing 2902 and engine 2910 attached to wing 2904.

Body 2906 has tail section 2912. Horizontal stabilizer 2914, horizontal stabilizer 2916, and vertical stabilizer 2918 are attached to tail section 2912 of body 2906.

Figure 30:
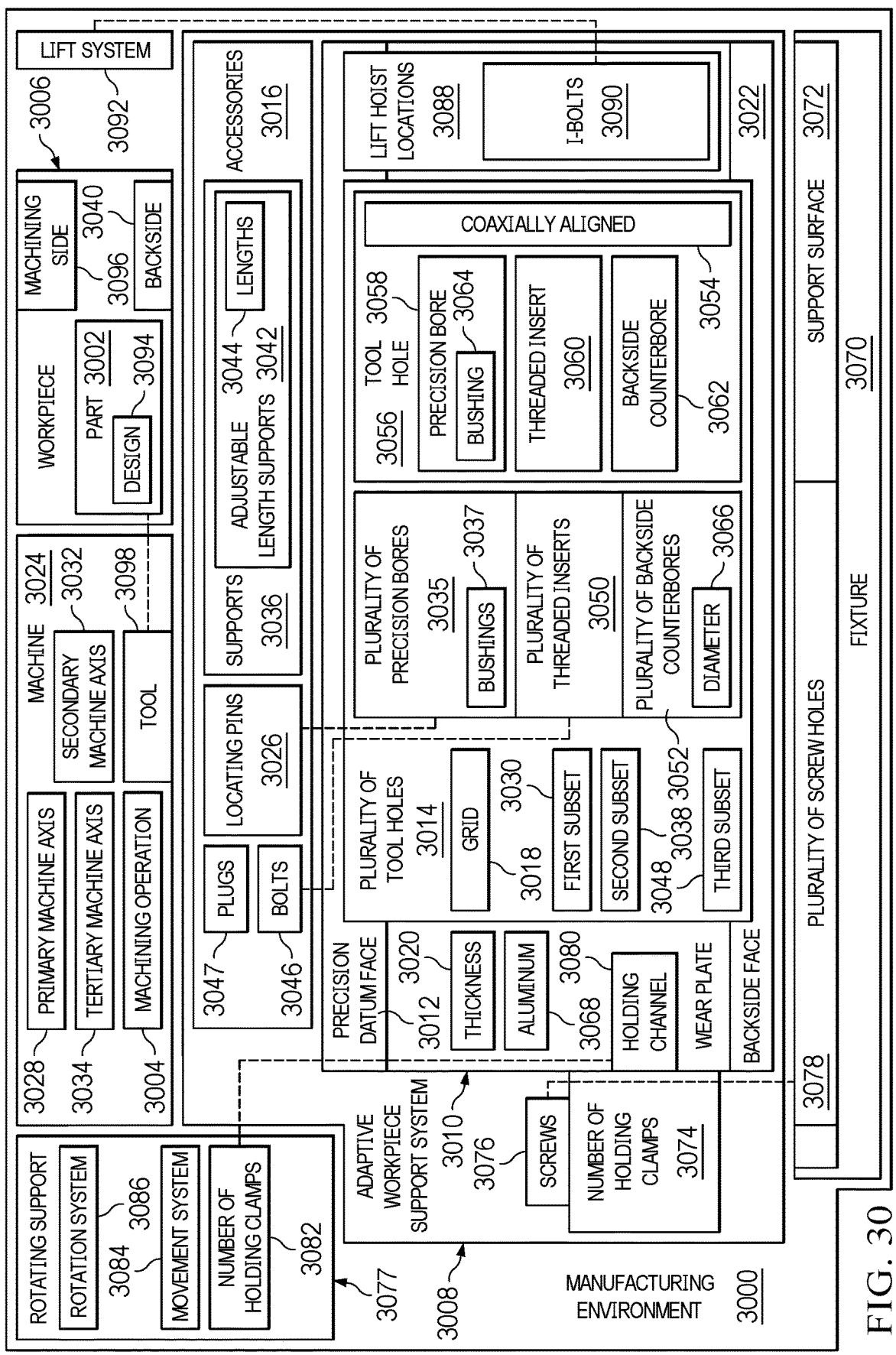
FIG. 30 is an illustration of a block diagram of a manufacturing environment in accordance with an illustrative embodiment.

Aircraft 2900 is an example of an aircraft that can have components manufactured using adaptive workpiece support system 3008 of FIG. 30. For example, a portion of wing 2902, wing 2904, or body 2906 can be machined while being supported by adaptive workpiece support system 3008 of FIG. 30.

Turning now to FIG. 30, an illustration of a block diagram of a manufacturing environment in accordance with an illustrative embodiment. Part 3002 can be manufactured in manufacturing environment 3000 by performing machining operation 3004 on workpiece 3006. Adaptive workpiece support system 3008 holds, locates, and supports workpiece 3006 for machining operation 3004. In some illustrative examples, adaptive workpiece support system 3008 comprises adaptive tooling fixture 200 of FIG. 1, and 22-25.

Adaptive workpiece support system 3008 comprises wear plate 3010 having precision datum face 3012 and plurality of tool holes 3014, and accessories 3016 that are interactive with plurality of tool holes 3014 of wear plate 3010 to support, locate, and hold workpiece 3006 against wear plate 3010 for machining workpiece 3006. Wear plate 3010 can be an implementation of base 202 of FIGS. 1, 22-25. Axial locking mechanism 100 of FIGS. 1-25 can be used in accessories 3016.

Plurality of tool holes 3014 is laid out in grid 3018 and extend through precision datum face 3012, thickness 3020 of wear plate 3010, and backside face 3022 of wear plate 3010. Wear plate 3010 is configured to locate workpiece 3006 relative to three axes of machine 3024.

Wear plate 3010 is a universal solution to various machine platforms. Wear plate 3010 encompasses the three primary functions of workholding: holding, locating, and supporting. Plurality of tool holes 3014 are present in grid 3018 extending through precision datum face 3012. The three primary functions of workholding: holding, locating, and supporting each exist in each tool hole of plurality of tool holes 3014.

Accessories 3016 comprise locating pins 3026 configured to interface with any of plurality of tool holes 3014 to locate workpiece 3006 relative to at least one of the three axes of machine 3024. In some illustrative examples, precision datum face 3012 is configured to locate workpiece 3006 flat relative to primary machine axis 3028. In some illustrative examples, lowering workpiece 3006 into contact with precision datum face 3012 of wear plate 3010 locates workpiece 3006 relative to primary machine axis 3028 of machine 3024. In some illustrative examples, positioning workpiece 3006 over wear plate 3010 such that locating pins 3026 are positioned in workpiece 3006 and in first subset 3030 of plurality of tool holes 3014 of wear plate 3010 to locate workpiece 3006 in secondary machine axis 3032 and tertiary machine axis 3034 of machine 3024.

First subset 3030 comprises any desirable quantity of tool holes of plurality of tool holes 3014. First subset 3030 comprises any desirable locations of tool holes of plurality of tool holes 3014.

In some illustrative examples, locating pins 3026 are secured in first subset 3030 of plurality of tool holes 3014 prior to positioning workpiece 3006 over wear plate 3010. In some illustrative examples, locating pins 3026 are secured in workpiece 3006 prior to lowering workpiece 3006 towards wear plate 3010. In some illustrative examples, a portion of locating pins 3026 are initially secured in wear plate 3010 while a second portion of locating pins 3026 are initially secured in workpiece 3006.

In some illustrative examples, plurality of tool holes 3014 comprises plurality of precision bores 3035. Plurality of precision bores 3035 is configured to interface with locating pins 3026. In some illustrative examples, plurality of tool holes 3014 comprises plurality of precision bores 3035 configured to receive locating pins 3026 to locate workpiece 3006 relative to secondary machine axis 3032 and tertiary machine axis 3034. In some illustrative examples, plurality of precision bores 3035 comprise bushings 3037 secured within wear plate 3010.

In some illustrative examples, accessories 3016 comprise supports 3036 connected to wear plate 3010 at second subset 3038 of plurality of tool holes 3014 and extending through precision datum face 3012 to contact backside 3040 of workpiece 3006. In some illustrative examples, supports 3036 are adjustable length supports 3042.

In some illustrative examples, plurality of adjustable length supports 3042 extends through thickness 3020 of wear plate 3010 such that lengths 3044 of plurality of adjustable length supports 3042 are adjustable from backside face 3022 of wear plate 3010. In some illustrative examples, adjustable length supports 3042 are adjustable using a mechanical tool. In some illustrative examples, adjustable length supports 3042 are adjustable pneumatically. In some illustrative examples, adjustable length supports 3042 are adjustable hydraulically.

In some illustrative examples, adaptive workpiece support system 3008 comprises locating pins 3026 positioned within first subset 3030 of plurality of tool holes 3014 to locate workpiece 3006 relative to at least one of the three axes of machine 3024; and adjustable length supports 3042 connected to wear plate 3010 at second subset 3038 of plurality of tool holes 3014 and extending through precision datum face 3012 to contact backside 3040 of the workpiece 3006.

In some illustrative examples, accessories 3016 comprises bolts 3046 configured to engage with wear plate 3010 and hold workpiece 3006 to wear plate 3010 for machining. In some illustrative examples, bolts 3046 engage with third subset 3048 of plurality of tool holes 3014. In some illustrative examples, plurality of tool holes 3014 comprises plurality of threaded inserts 3050. In some illustrative examples, bolts 3046 engage a subset of plurality of threaded inserts 3050.

In some illustrative examples, plurality of tool holes 3014 comprises plurality of threaded inserts 3050 secured within plurality of tool holes 3014, and accessories 3016 comprise bolts 3046 configured to extend into workpiece 3006, engage with any of plurality of threaded inserts 3050, and hold workpiece 3006 to wear plate 3010 for machining.

In some illustrative examples, accessories 3016 include plugs 3047. In some illustrative examples, plugs 3047 are utilized in at least one of plurality of tool holes 3014 instead of a precision bore. Plugs 3047 allow for replaceable material to increase customization of wear plate 3010. In some illustrative examples, plugs 3047 provide enhanced hole position accuracy when utilizing the adaptive wear on different machines. In some illustrative examples, plugs 3047 are referred to as "indicating less plugs" meant to be replaceable. Plugs 3047 can be machined to provide various different diameters instead of a single hardened steel bushing, such as bushing 3064 that creates a precision bore of a single diameter. Plugs 3047 provide a standard solid round plug that a precision tooling hole of custom varying diameters or purpose, for example, threaded, precision, etc., can be machined into wear plate 3010 upon loading on various different machines. Plugs 3047 allow for customization of tooling diameter holes and function. In some illustrative examples, plugs 3047 can lighten the weight of wear plate 3010 by utilizing a lighter weight material than bushings 3037. In some illustrative examples, plugs 3047 can reduce cost by utilizing an aluminum lower cost plug versus a precision ground bushing, such as bushing 3064. Plugs 3047 can be pressed into the same position as hardened bushings, such as bushings 3037, instead of bushings 3037.

Utilizing plugs 3047 takes into account that each machine has a different level of position accuracy. Plugs 3047 can allow machine 3024 to create a new feature therefore aligning the machine position accuracy to wear plate 3010. Plugs 3047 can save time from manual measurement and alignment from machine to machine. Plugs 3047 can increase the accuracy of locating the wear plate 3010 and workpiece 3006 to at least one machine axis. To remove a plug of plugs 3047, a tapped hole and slide hammer can extract the respective plug and a new plug can be installed. An anti-rotational feature such a roll pin between wear plate 3010 and the plug can be installed so the plug does not spin in wear plate 3010.

In some illustrative examples, plurality of tool holes 3014 comprises plurality of precision bores 3035, plurality of threaded inserts 3050, and plurality of backside counterbores 3052. In some illustrative examples, each tool hole of plurality of tool holes 3014 comprises a respective precision bore, respective threaded insert, and respective backside counterbore coaxially aligned 3054 with each other. For example, tool hole 3056 of plurality of tool holes 3014 comprises precision bore 3058, threaded insert 3060, and backside counterbore 3062 coaxially aligned 3054 with each other. In some illustrative examples, precision bore 3058 comprises bushing 3064.

Precision bore 3058 is one of plurality of precision bores 3035. Each of plurality of precision bores 3035 has a same size and shape. Threaded insert 3060 is one of plurality of threaded inserts 3050. Each of plurality of threaded inserts 3050 has a same design as each other threaded insert of plurality of threaded inserts 3050. Backside counterbore 3062 is one of plurality of backside counterbores 3052.

Plurality of tool holes 3014 comprises plurality of backside counterbores 3052 in backside face 3022. Plurality of backside counterbores 3052 has diameter 3066 sufficient to utilize a socket tool within plurality of backside counterbores 3052. In some illustrative examples, a socket can be used to adjust lengths 3044 of adjustable length supports 3042. Plurality of backside counterbores 3052 enable adjustment of adjustable length supports 3042 from backside face 3022 of wear plate 3010.

In some illustrative examples, plurality of backside counterbores 3052 are formed in the material of wear plate 3010. In some illustrative examples, wear plate 3010 is formed of a metal. In some illustrative examples, wear plate 3010 is formed of aluminum 3068. In some illustrative examples, plurality of backside counterbores 3052 are formed of aluminum 3068 of wear plate 3010.

In some illustrative examples, plurality of tool holes 3014 comprises plurality of threaded inserts 3050 secured within plurality of tool holes 3014. In some illustrative examples, plurality of threaded inserts 3050 is secured within aluminum 3068 of wear plate 3010.

In some illustrative examples, wear plate 3010 is secured to fixture 3070 prior to machining workpiece 3006. In some illustrative examples, backside face 3022 of wear plate 3010 is configured to rest on support surface 3072 of fixture 3070.

In some illustrative examples, adaptive workpiece support system 3008 comprises a number of holding clamps. The number of holding clamps can take the form of number of holding clamps 3074 or number of holding clamps 3082. In some illustrative examples, adaptive workpiece support system 3008 comprises number of holding clamps 3074 in contact with wear plate 3010 to secure wear plate 3010 to one of rotating support 3077 or fixture 3070.

To secure wear plate 3010 to fixture 3070, screws 3076 of number of holding clamps 3074 are secured to plurality of screw holes 3078 of fixture 3070. In some illustrative examples, wear plate 3010 comprises holding channel 3080 in a side of wear plate 3010 configured to receive a number of holding clamps, such as number of holding clamps 3074 or number of holding clamps 3082.

Rotating support 3077 can be used to support wear plate 3010 prior to machining workpiece 3006. Rotating support 3077 can be used to support wear plate 3010 to configure wear plate 3010 and accessories 3016 for supporting workpiece 3006. In some illustrative examples, accessories 3016 are positioned in wear plate 3010 while wear plate 3010 is secured to rotating support 3077.

Rotating support 3077 comprises number of holding clamps 3082 to secure wear plate 3010 to rotating support 3077. Rotating support 3077 allows loading/unloading of wear plate 3010. Rotating support 3077 safely and securely holds wear plate 3010. Number of holding clamps 3082 holds wear plate 3010 on rotating support 3077.

Rotating support 3077 comprises rotation system 3086 configured to rotate wear plate 3010 to alternate an accessible face between precision datum face 3012 and backside face 3022. Rotating support 3077 provides rotation of at least 180° for access to backside face 3022 of wear plate 3010.

In some illustrative examples, rotating support 3077 further comprises movement system 3084. Movement system 3084 is configured to move rotating support 3077 within manufacturing environment 3000. In some illustrative examples, movement system 3084 is used to move rotating support 3077 within manufacturing environment 3000 while wear plate 3010 is secured to rotating support 3077. Rotating support 3077 moves within manufacturing environment 300 to allow crane access to wear plate 3010.

Rotating support 3077 allows for unobstructed access to precision datum face 3012 and backside face 3022 to position and adjust accessories 3016. Rotating support 3077 is configured to support the full weight of wear plate 3010 and accessories 3016. In some illustrative examples, rotating support 3077 is configured to support the full weight of wear plate 3010, accessories 3016, and workpiece 3006. In some illustrative examples, the full weight of wear plate 3010, accessories 3016, and workpiece 3006 can be multiple thousands of pounds.

Wear plate 3010 further comprises lift hoist locations 3088 extending through the precision datum face 3012 configured to allow lifting of wear plate 3010. In some illustrative examples, lift hoist locations 3088 comprise threaded holes configured to receive I-bolts 3090. Lift hoist locations 3088 enable lifting of wear plate 3010 from at least one of rotating support 3077 or fixture 3070 by lift system 3092. Lift system 3092 takes any desirable form. In some illustrative examples, lift system 3092 takes the form of a crane system.

Part 3002 is to be machined into workpiece 3006. The types of accessories 3016 and positioning of accessories 3016 are selected and configured based on design 3094 of part 3002 to be created in workpiece 3006.

Supports 3036 contact backside 3040 of workpiece 3006 while tool 3098 performs machining operation 3004 on machining side 3096 of workpiece 3006 to form part 3002. Supports 3036 provide support to the material of workpiece 3006 to reduce chatter of workpiece 3006.

Adjustable length supports 3042 in conjunction with plurality of backside counterbores 3052 laid out in grid 3018 pattern allows for quick disconnect of adjustable length supports 3042. In some illustrative examples, adjustable length supports 3042 are hex bars with backside clearance for industry standard sockets.

In some illustrative examples, supports 3036 are hex work supports as in FIGS. 2-7. In some illustrative examples, supports 3036 provide work hold damping and adaptive freeform part features.

The illustration of manufacturing environment 3000 in FIG. 30 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, an epoxy or UV adhesive is provided as an adhesive on supports 3036. The epoxy or UV adhesive can hold supports 3036 and part 3002. In some illustrative examples, the epoxy or adhesive can act as a cushion.

Figure 31:
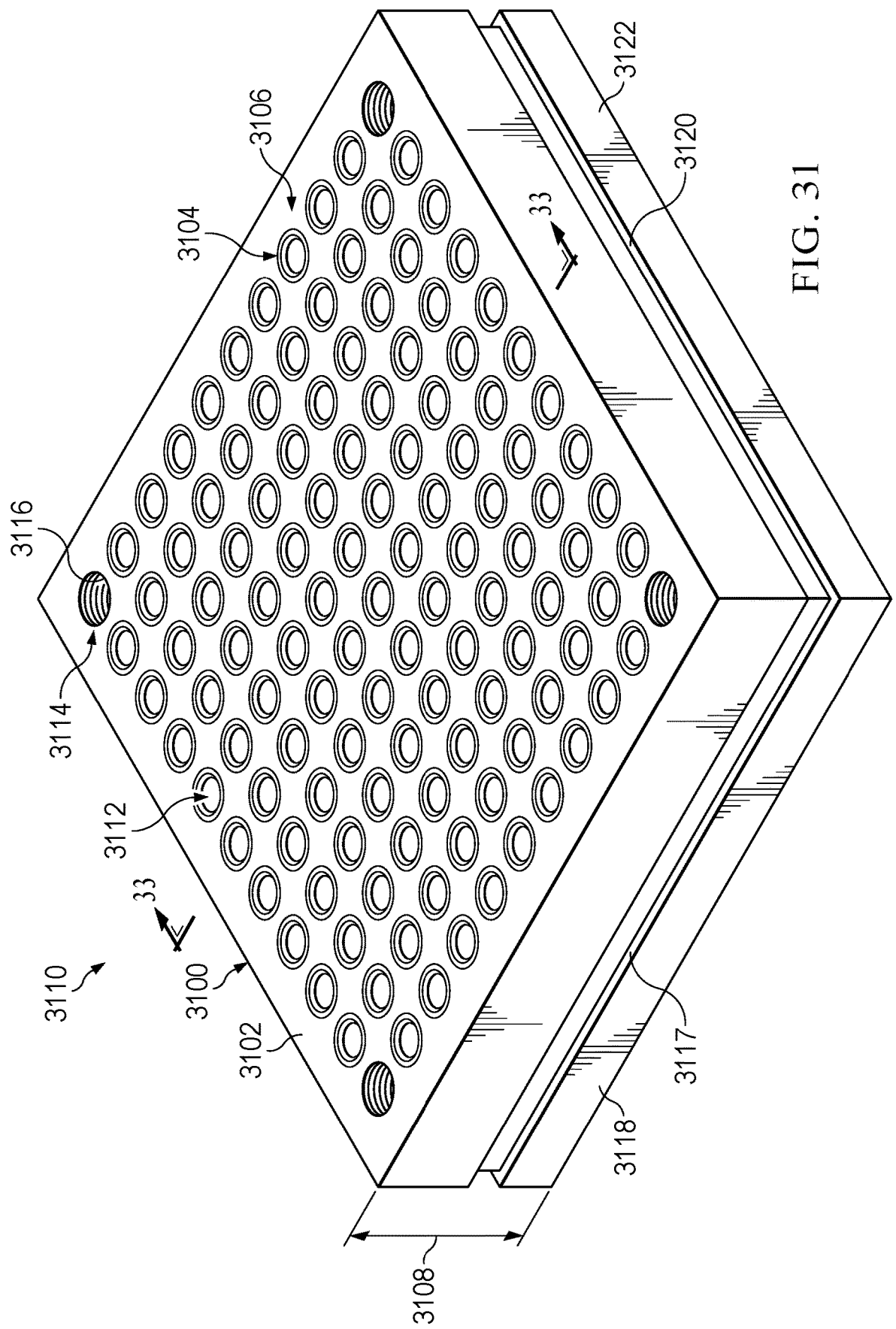
FIG. 31 is an illustration of an isometric view of a top of a wear plate in accordance with an illustrative embodiment.

Turning now to FIG. 31, an illustration of an isometric view of a top of a wear plate is depicted in accordance with an illustrative embodiment. Wear plate 3100 is a physical implementation of wear plate 3010 of FIG. 30. In some illustrative examples wear plate 3100 can be an example of a physical implementation of base 202 of at least one of FIG. 1, FIG. 22, FIG. 23, FIG. 24, or FIG. 25. Implementations of axial locking mechanism 100 of FIGS. 1-25 can be used with wear plate 3100.

Wear plate 3100 comprises precision datum face 3102 configured to locate a workpiece flat relative to a primary machine axis. Wear plate 3100 can be used to locate workpiece 3006 relative to machine 3024 of FIG. 30. Precision datum face 3102 has been machined to a precision sufficient to locate the workpiece to perform operations on the workpiece.

Wear plate 3100 comprises plurality of tool holes 3104 laid out in grid 3106 and extending through precision datum face 3102, thickness 3108 of wear plate 3100, and backside face (not depicted) of wear plate 3100. Plurality of tool holes 3104 is configured to locate the workpiece relative to a secondary machine axis and a tertiary machine axis.

Each tool hole of plurality of tool holes 3104 comprises a respective precision bore, a respective threaded insert, and a backside counterbore in the backside face (not depicted). In view 3110, plurality of precision bores 3112 of plurality of tool holes 3104 is visible. Plurality of precision bores 3112 extend through precision datum face 3102.

Plurality of precision bores 3112 are formed with precision sufficient to locate the workpiece relative to a secondary machine axis and a tertiary machine axis of a machine. Accessories can interact with a first subset of plurality of tool holes 3104 to locate the workpiece. A subset of plurality of tool holes 3104 includes any desirable quantity of tool holes of plurality of tool holes 3104. A subset of plurality of tool holes 3104 includes any desirable locations of tool holes in plurality of tool holes 3104.

In one illustrative example, locating pins can be positioned within a first subset of plurality of tool holes 3104 to locate the workpiece. Accessories can interact with plurality of precision bores 3112 to locate the workpiece. In some illustrative examples, locating pins interact with respective precision bores of the first subset of plurality of tool holes 3104 to locate the workpiece.

Lift hoist locations 3114 are also visible in view 3110. Lift hoist locations 3114 extend through precision datum face 3102. Lift hoist locations 3114 are configured to allow lifting of wear plate 3100. In this illustrative example, lift hoist locations 3114 comprise threaded holes 3116 configured to receive I-bolts.

As depicted, wear plate 3100 comprises holding channel 3117 in side 3118 configured to receive a number of holding clamps. The number of holding clamps can restrain wear plate 3100 on a fixture, a rotating support, or any other desirable tool. As depicted, wear plate 3100 comprises holding channel 3120 in side 3122 configured to receive a number of holding clamps.

Figure 32:
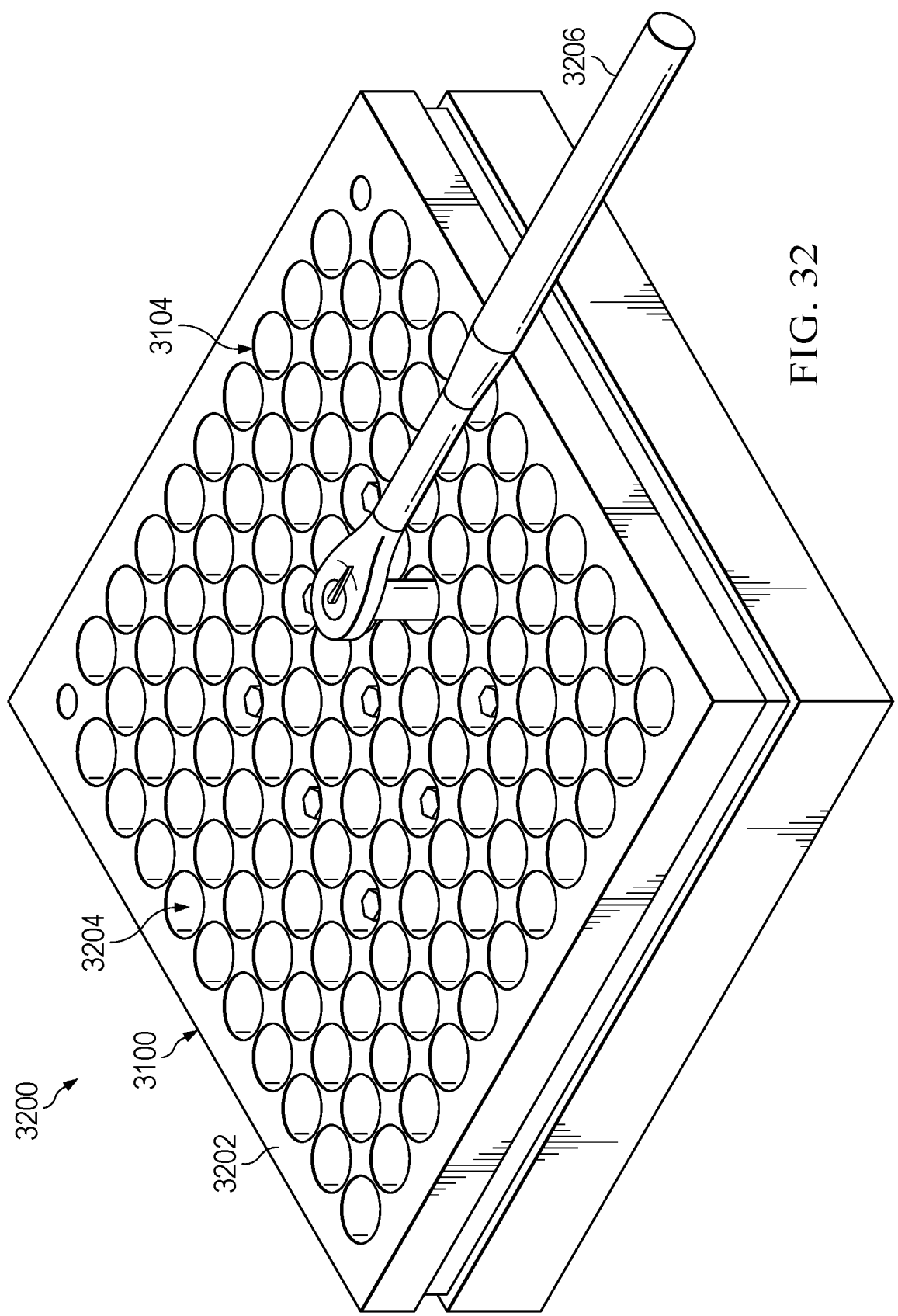
FIG. 32 is an illustration of an isometric view of a bottom of a wear plate in accordance with an illustrative embodiment.

Turning now to FIG. 32, an illustration of an isometric view of a bottom of a wear plate is depicted in accordance with an illustrative embodiment. View 3200 is a back view of wear plate 3100 of FIG. 31. As can be seen in view 3200, plurality of tool holes 3104 extends through backside face 3202 of wear plate 3100. In view 3200, plurality of backside counterbores 3204 in backside face 3202 is visible.

Plurality of backside counterbores 3204 has a diameter sufficient to utilize a socket tool within plurality of backside counterbores 3204. By plurality of backside counterbores 3204 having sufficient diameter to utilize socket tool 3206, accessories within plurality of tool holes 3104 can be adjusted through backside face 3202.

Figure 33:
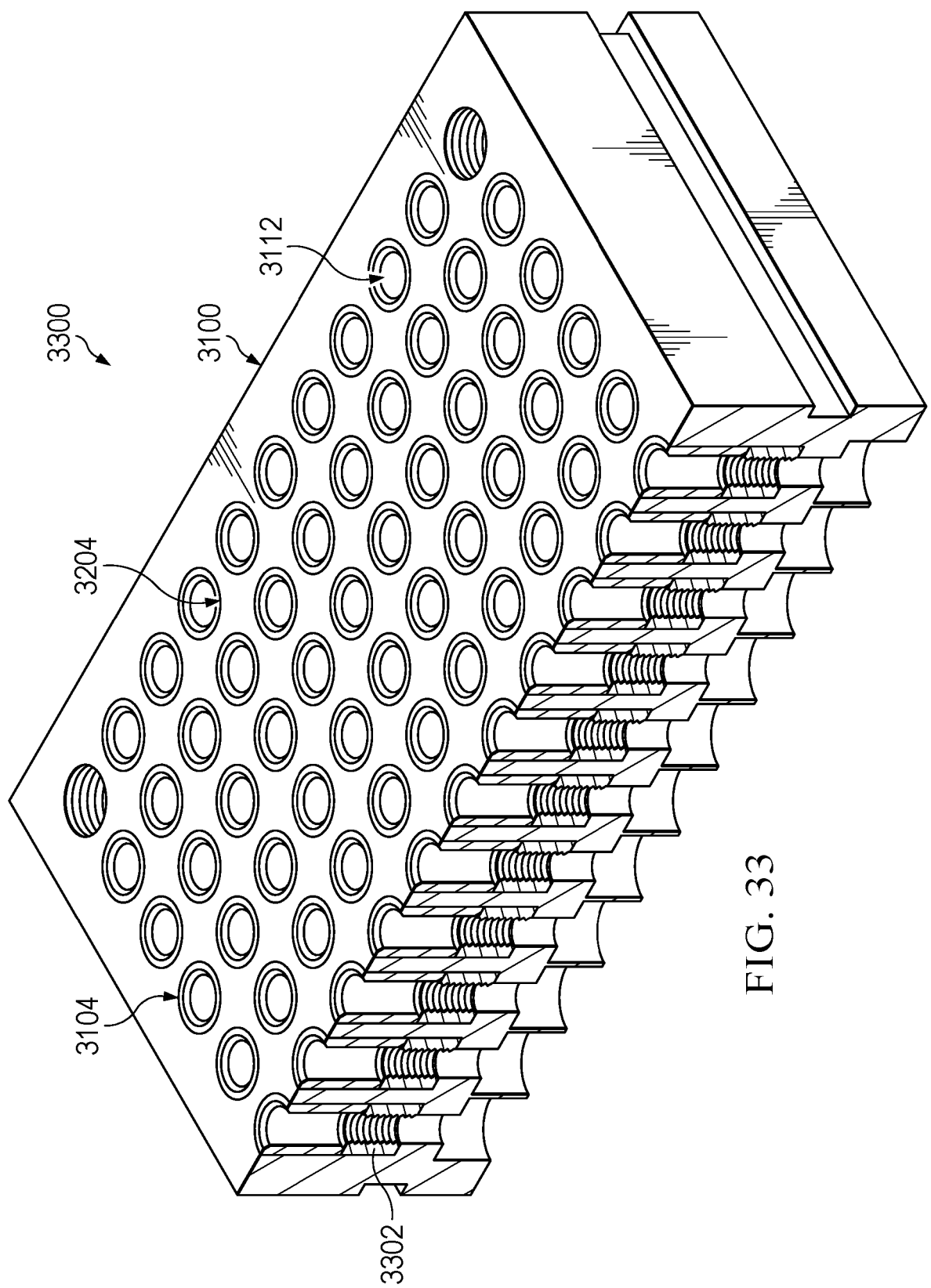
FIG. 33 is an illustration of a partial cross-sectional view of a wear plate in accordance with an illustrative embodiment.

Turning now to FIG. 33, an illustration of a partial cross-sectional view of a wear plate is depicted in accordance with an illustrative embodiment. View 3300 is a cross-sectional view of wear plate 3100 of FIGS. 31 and 32. In view 3300, plurality of threaded inserts 3302 are visible in plurality of tool holes 3104. Plurality of tool holes 3104 comprises plurality of precision bores 3112, plurality of threaded inserts 3302, and plurality of backside counterbores 3204. Plurality of precision bores 3112 is configured to receive locating pins to locate the workpiece relative to a secondary machine axis and a tertiary machine axis. Plurality of threaded inserts 3302 is secured within plurality of tool holes 3104. Plurality of threaded inserts 3302 can interact with accessories to perform any desirable function of holding, supporting, or locating. In some illustrative examples, accessories interact with a subset of plurality of threaded inserts 3302 to hold the workpiece (not depicted) against wear plate 3100. In some illustrative examples, accessories interact with a subset of plurality of threaded inserts 3302 to support the workpiece (not depicted) during machining. In some illustrative examples, adjustable length supports (not depicted) can interact with plurality of threaded inserts 3302.

Figure 34:
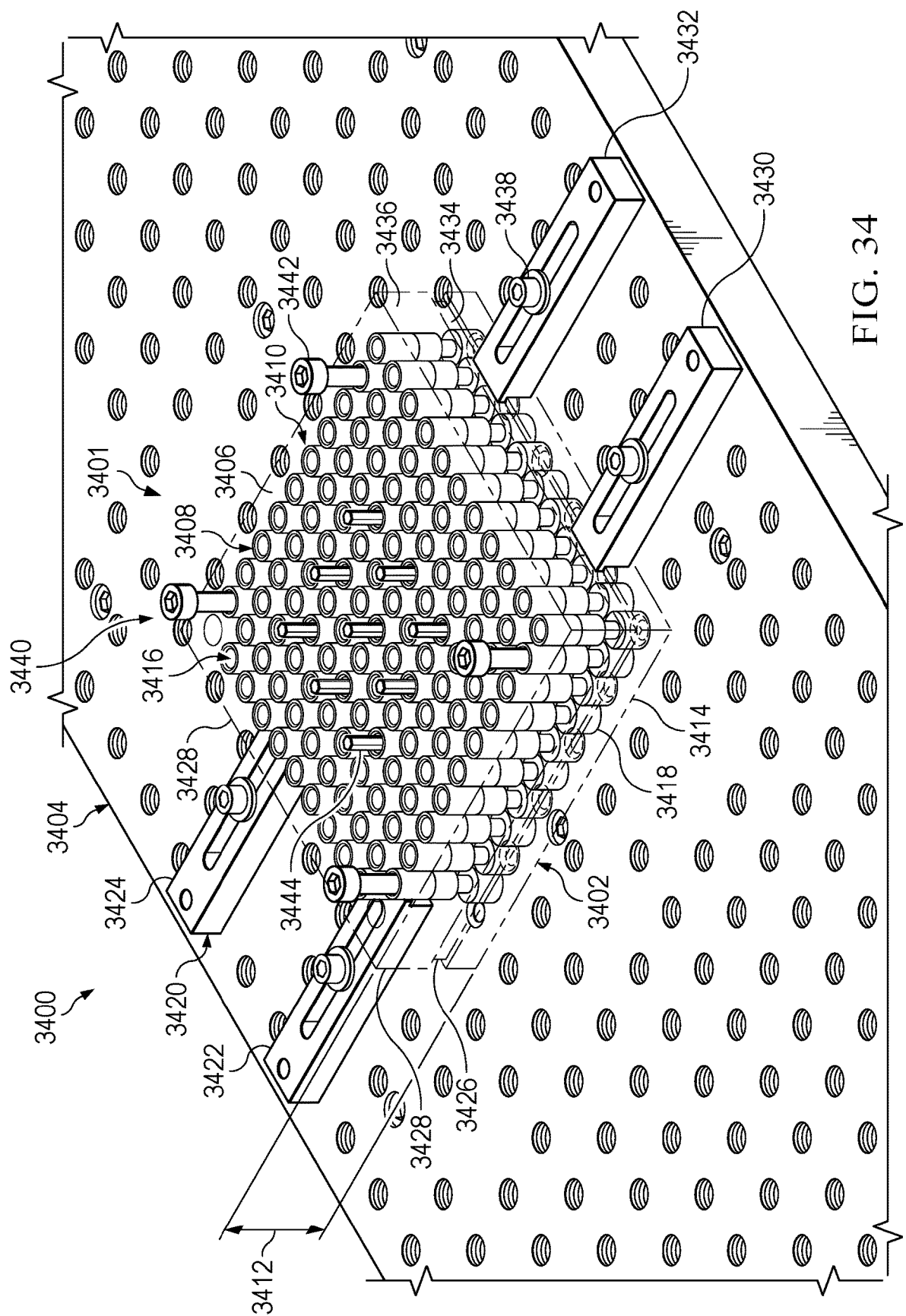
FIG. 34 is an illustration of an isometric view of an adaptive workpiece support system in accordance with an illustrative embodiment.

Turning now to FIG. 34, an illustration of an isometric view of an adaptive workpiece support system is depicted in accordance with an illustrative embodiment. View 3400 is an isometric view of adaptive workpiece support system 3401. Adaptive workpiece support system 3401 comprises wear plate 3402 and accessories 3440. In view 3400, wear plate 3402 is secured to fixture 3404. Wear plate 3402 is prepared to receive a workpiece. Accessories 3440 have been associated with wear plate 3402 to prepare wear plate 3402 to hold, locate, and support a workpiece.

Wear plate 3402 is a physical implementation of wear plate 3010 of FIG. 30. In some illustrative examples wear plate 3402 can be an example of a physical implementation of base 202 of at least one of FIG. 1, FIG. 22, FIG. 23, FIG. 24, or FIG. 25. Implementations of axial locking mechanism 100 of FIGS. 1-25 can be used with wear plate 3402.

Wear plate 3402 comprises precision datum face 3406 configured to locate a workpiece flat relative to a primary machine axis. Wear plate 3402 can be used to locate workpiece 3006 relative to machine 3024 of FIG. 30. Precision datum face 3406 has been machined to a precision sufficient to locate the workpiece to perform operations on the workpiece.

Wear plate 3402 comprises plurality of tool holes 3408 laid out in grid 3410 and extending through precision datum face 3406, thickness 3412 of wear plate 3402, and backside face 3414 of wear plate 3402. Plurality of tool holes 3408 is configured to locate the workpiece relative to a secondary machine axis and a tertiary machine axis.

Each tool hole of plurality of tool holes 3408 comprises a respective precision bore, a respective threaded insert, and a backside counterbore in the backside face (not depicted). In view 3400, plurality of precision bores 3416 of plurality of tool holes 3408 is visible. Plurality of precision bores 3416 extend through precision datum face 3406.

As can be seen in view 3400, plurality of tool holes 3408 extends through backside face 3414 of wear plate 3402. Plurality of backside counterbores 3418 of plurality of tool holes 3408 extend through backside face 3414. In view 3400, some of plurality of backside counterbores 3418 in backside face 3414 are visible. Plurality of backside counterbores 3418 has a diameter sufficient to utilize a socket tool within plurality of backside counterbores 3418.

Number of holding clamps 3420 restrain wear plate 3402 against fixture 3404. Number of holding clamps 3420 includes holding clamp 3422 and holding clamp 3424 that interface with holding channel 3426 in side 3428 to secure wear plate 3402. Number of holding clamps 3420 includes holding clamp 3430 and holding clamp 3432 that interface with holding channel 3434 in side 3436 to secure wear plate 3402. Number of holding clamps 3420 comprises screws 3438 to secure number of holding clamps 3420 in place relative to fixture 3404.

Accessories 3440 are interactive with plurality of tool holes 3408 of wear plate 3402 to support, locate, and hold a workpiece (not depicted) against wear plate 3402 for machining the workpiece. Accessories 3440 are a physical implementation of accessories 3016 of FIG. 30. A part is machined into the workpiece. The types of accessories 3440 and positioning of accessories 3440 are selected and configured based on a design of the part to be created in the workpiece.

In this illustrative example, accessories 3440 include bolts 3442 and supports 3444. Bolts 3442 can be used to secure the workpiece to wear plate 3402. Supports 3444 can be used to support an underside of the workpiece during machining.

Figure 35:
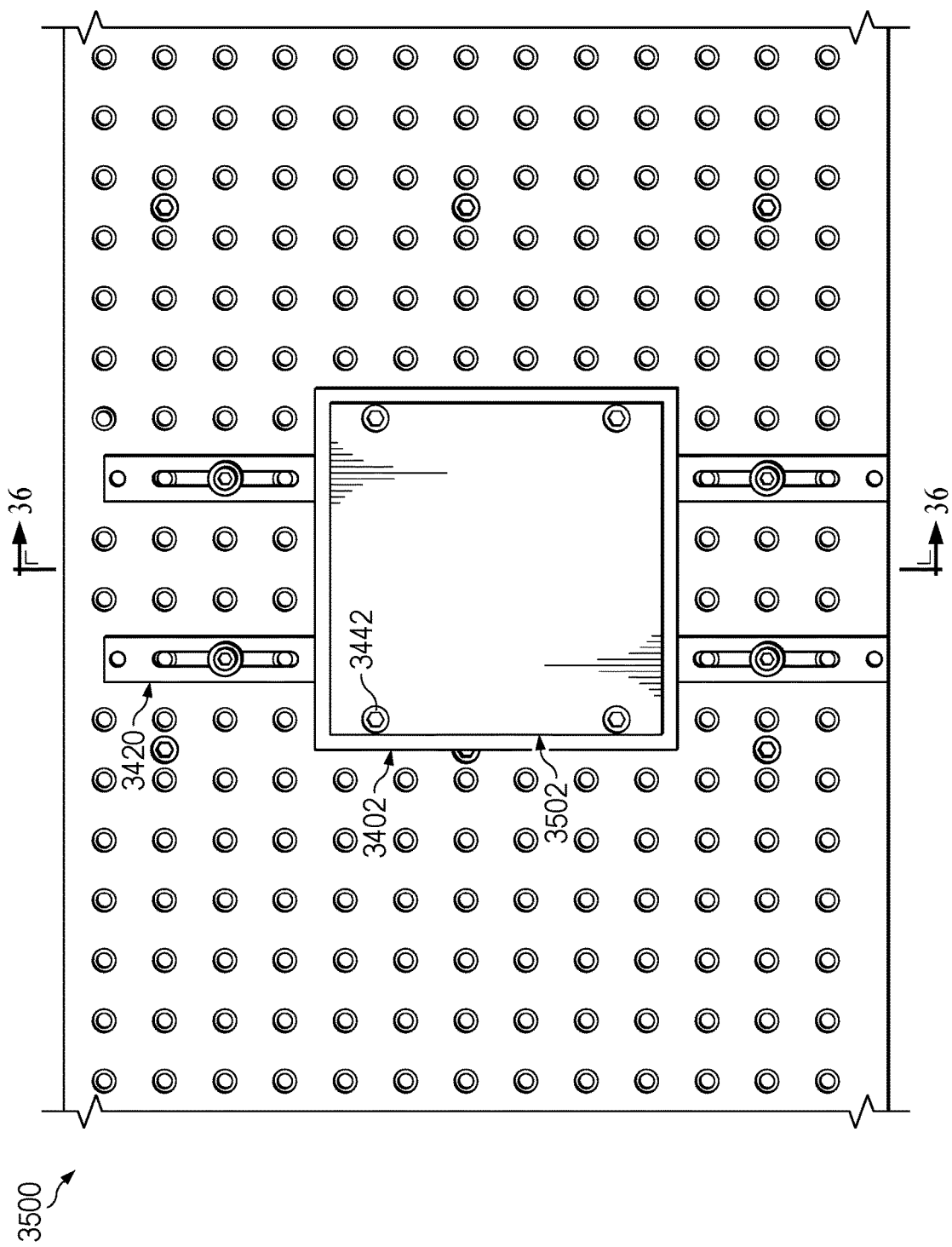
FIG. 35 is an illustration of a top view of a workpiece secured to an adaptive workpiece support system in accordance with an illustrative embodiment.

Turning now to FIG. 35, an illustration of a top view of a workpiece secured to an adaptive workpiece support system is depicted in accordance with an illustrative embodiment. View 3500 is a top view of workpiece 3502 secured to wear plate 3402 using bolts 3442. Workpiece 3502 is secured to wear plate 3402 prior to machining workpiece 3502.

Figure 36:
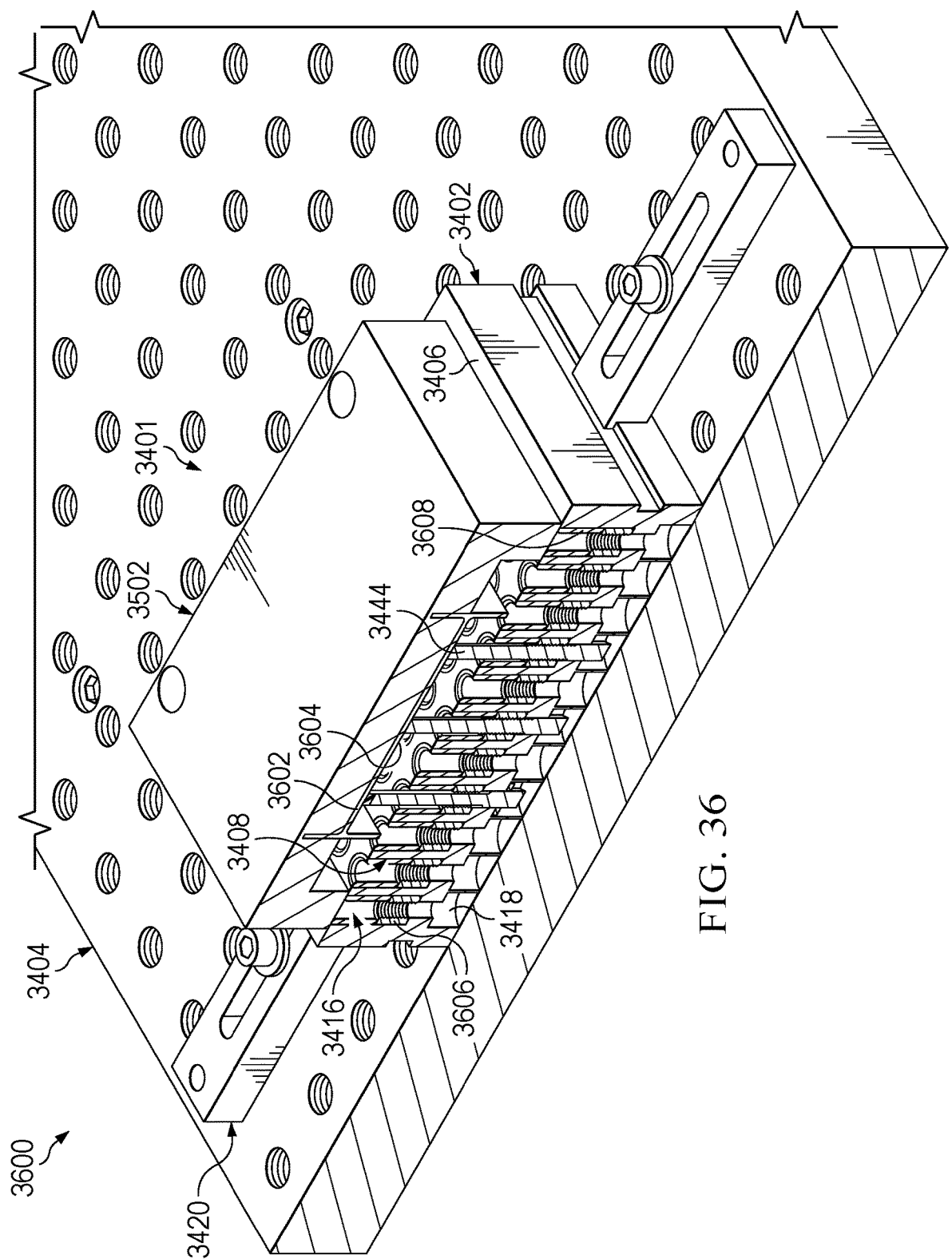
FIG. 36 is an illustration of an isometric cross-section of a workpiece secured to an adaptive workpiece support system in accordance with an illustrative embodiment.

Turning now to FIG. 36, an illustration of an isometric cross-section of a workpiece secured to an adaptive workpiece support system is depicted in accordance with an illustrative embodiment. View 3600 is a cross-sectional view through workpiece 3502 and adaptive workpiece support system 3401.

In view 3600 workpiece 3502 has not yet undergone machining operations. Part 3602 to be formed by machining is identified in view 3600 only for explanative purposes. As can be seen in view 3600, part 3602 will be quite thin above supports 3444. Supports 3444 are in contact with backside 3604 of workpiece 3502. Supports 3444 provide support to workpiece 3502 by contacting backside 3604 of workpiece 3502 during the machining operation.

Plurality of tool holes 3408 can be seen in view 3600. Plurality of tool holes 3408 comprises plurality of precision bores 3416, plurality of threaded inserts 3606, and backside counterbores 3418. As depicted, backside counterbores 3418 are formed directly in material of wear plate 3402. As depicted, plurality of precision bores 3416 comprises bushings 3608. Each of bushings 3608 and plurality of threaded inserts 3606 is installed into material of wear plate 3402.

Figure 37:
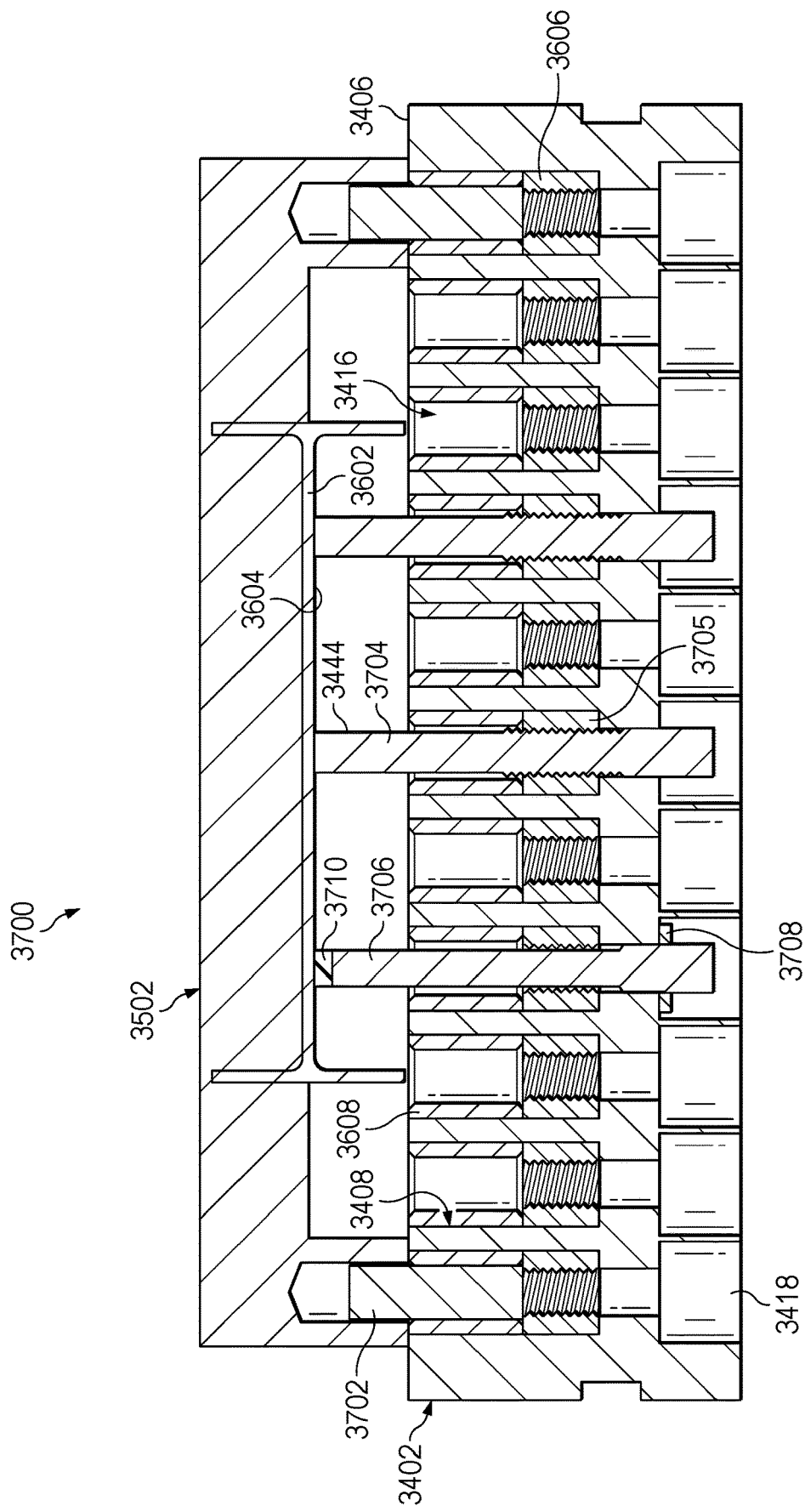
FIG. 37 is an illustration of a cross-sectional view of a workpiece secured to an adaptive workpiece support system in accordance with an illustrative embodiment.

Turning now to FIG. 37, an illustration of a cross-sectional view of a workpiece secured to an adaptive workpiece support system is depicted in accordance with an illustrative embodiment. View 3700 is a cross-sectional view through workpiece 3502 and adaptive workpiece support system 3401.

In view 3700, number of locating pins 3702 is visible. Number of locating pins 3702 is present between workpiece 3502 and wear plate 3402. Number of locating pins 3702 engages with plurality of tool holes 3408 to locate workpiece 3502 relative to a secondary machine axis and a tertiary machine axis.

Number of locating pins 3702 interface with precision bores 3416 to locate workpiece 3502. As can be seen in view 3700, each of precision bores 3416 has a same diameter. Number of locating pins 3702 can interface with any precision bore of precision bores 3416. Wear plate 3402 can locate workpieces of a variety of different sizes and shapes by providing precision bores 3416.

Supports 3444 can take any desirable form. In this illustrative example, supports 3444 include more than one type of support. Support 3704 is a threaded support. Support 3704 is secured in wear plate 3402 by a respective threaded insert, threaded insert 3705, of threaded inserts 3606.

Support 3706 is an example of axial locking mechanism 100 of FIGS. 1-25. Support 3706 is an example of rod 104. Support 3706 has any desirable cross-section to interact with and be restrained by lock 3708. Lock 3708 can be an implementation of lock 102 of FIGS. 1-25. In some illustrative examples, lock 3708 takes the form of a lock washer.

In some illustrative examples, lock 3708 is press fit in to the counterbores 3418 on the back side of wear plate 3402. Support 3706 is slid through lock 3708 until support 3706 makes contact with backside 3604 of workpiece 3502. Support 3706 has been rotated to cause interference "bite" between support 3706 and lock 3708 to secure in place during machining. In some illustrative examples, epoxy 3710 or UV light can be added on contacting surface between support 3706 and underside 3604 to secure support 3706 to workpiece 3502 during machining. To remove support 3706 from backside 3604, support 3706 is turned, releasing the bond from the Epoxy/UV adhesive. By turning support 3706, support 3706 is also simultaneously released from lock 3708 so support 3706 can be removed and part 3604 released from wear plate 3402.

Figure 38:
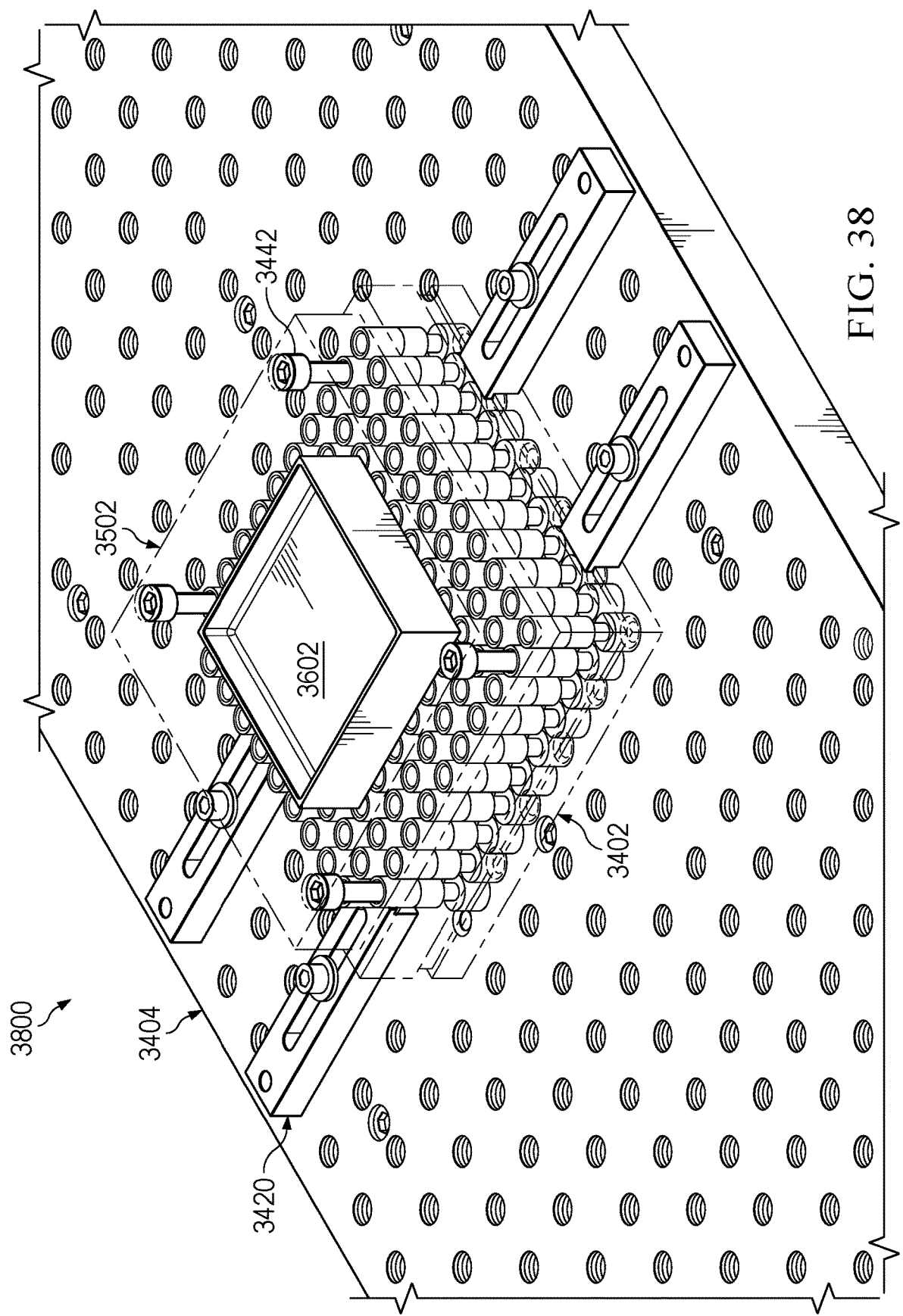
FIG. 38 is an illustration of a cross-sectional view of a workpiece secured to an adaptive workpiece support system in accordance with an illustrative embodiment.

Turning now to FIG. 38, an illustration of a cross-sectional view of a workpiece secured to an adaptive workpiece support system is depicted in accordance with an illustrative embodiment. In view 3800, machining has been performed on workpiece 3502 to form part 3602. In view 3800, supports 3444 are not visible. Supports 3444 are positioned below part 3602 to reduce chatter in workpiece 3502 during machining to form part 3602.

Figure 39:
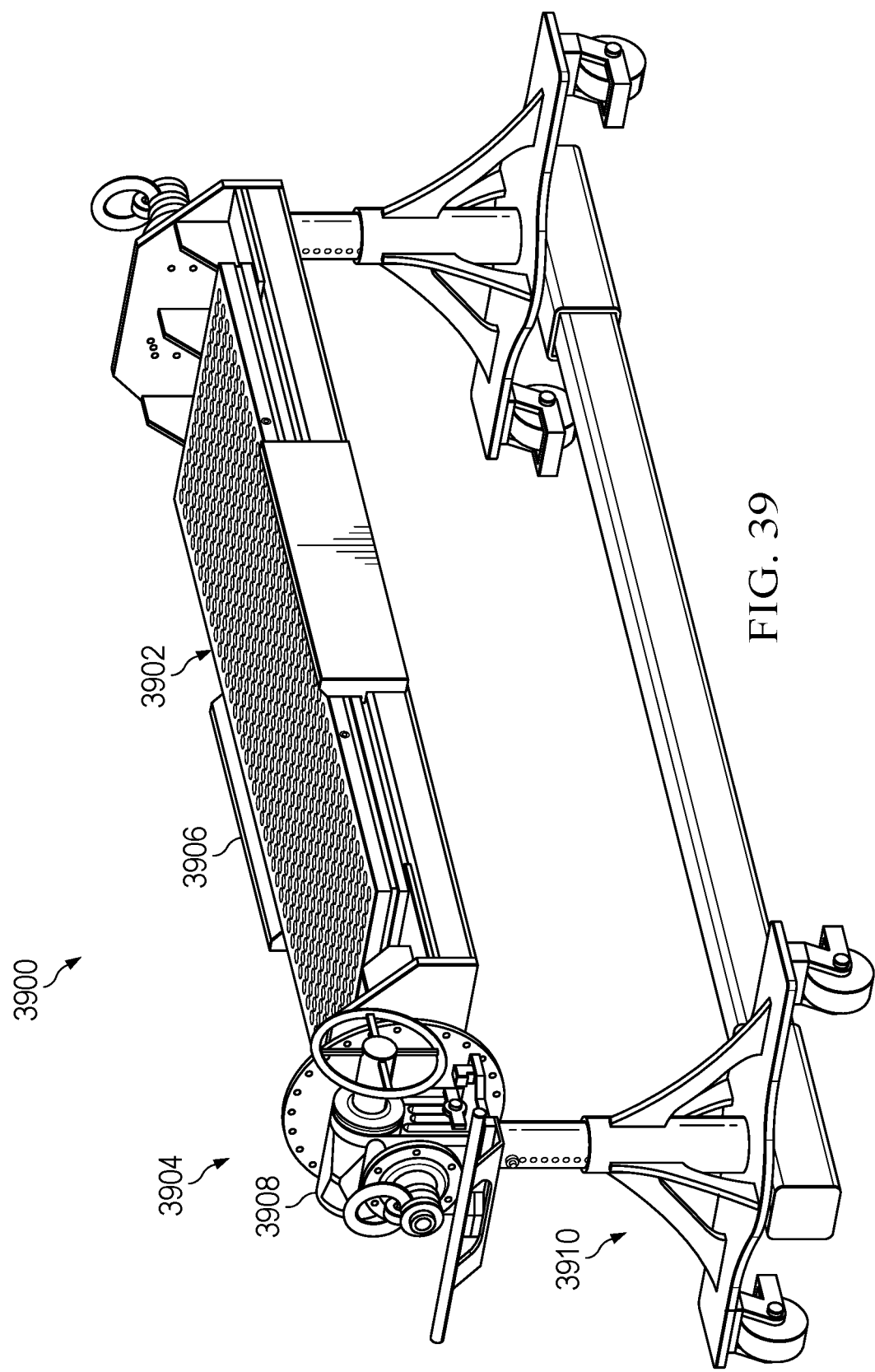
FIG. 39 is an illustration of an isometric view of a wear plate secured to a rotating support in accordance with an illustrative embodiment.

Turning now to FIG. 39, an illustration of an isometric view of a wear plate secured to a rotating support is depicted in accordance with an illustrative embodiment. In view 3900, wear plate 3902 is secured to rotating support 3904. Rotating support 3904 provides access to both sides of wear plate 3902. Rotating support 3904 allows for rotation of wear plate 3902 to insert accessories or adjust accessories in wear plate 3902.

Rotating support 3904 comprises number of holding clamps 3906, rotation system 3908, and movement system 3910. Number of holding clamps 3906 restrain wear plate 3902 on rotating support 3904 so that wear plate 3902 can be rotated between providing access to a precision datum face or a backside face of wear plate 3902. In some illustrative examples, number of holding clamps 3906 interface with a number of holding channels of wear plate 3902 to restrain wear plate 3902 on rotating support 3904.

Rotation system 3908 is configured to rotate wear plate 3902. In this illustrative example, rotation system 3908 is configured to rotate wear plate 3902 along a longitudinal axis to provide access to either a precision datum face or a backside face of wear plate 3902.

In this illustrative example, movement system 3910 takes the form of wheels to move rotating support 3904 within a manufacturing environment. In other illustrative examples, movement system 3910 can include treads, tracks, or any other desirable type of movement system to relocate rotating support 3904 within a manufacturing environment. In some illustrative examples, rotating support 3904 supports wear plate 3902 during relocation of rotating support 3904 within the manufacturing environment. In other illustrative examples, rotating support 3904 is moved within the manufacturing environment to be in a location to receive wear plate 3902.

Figure 40:
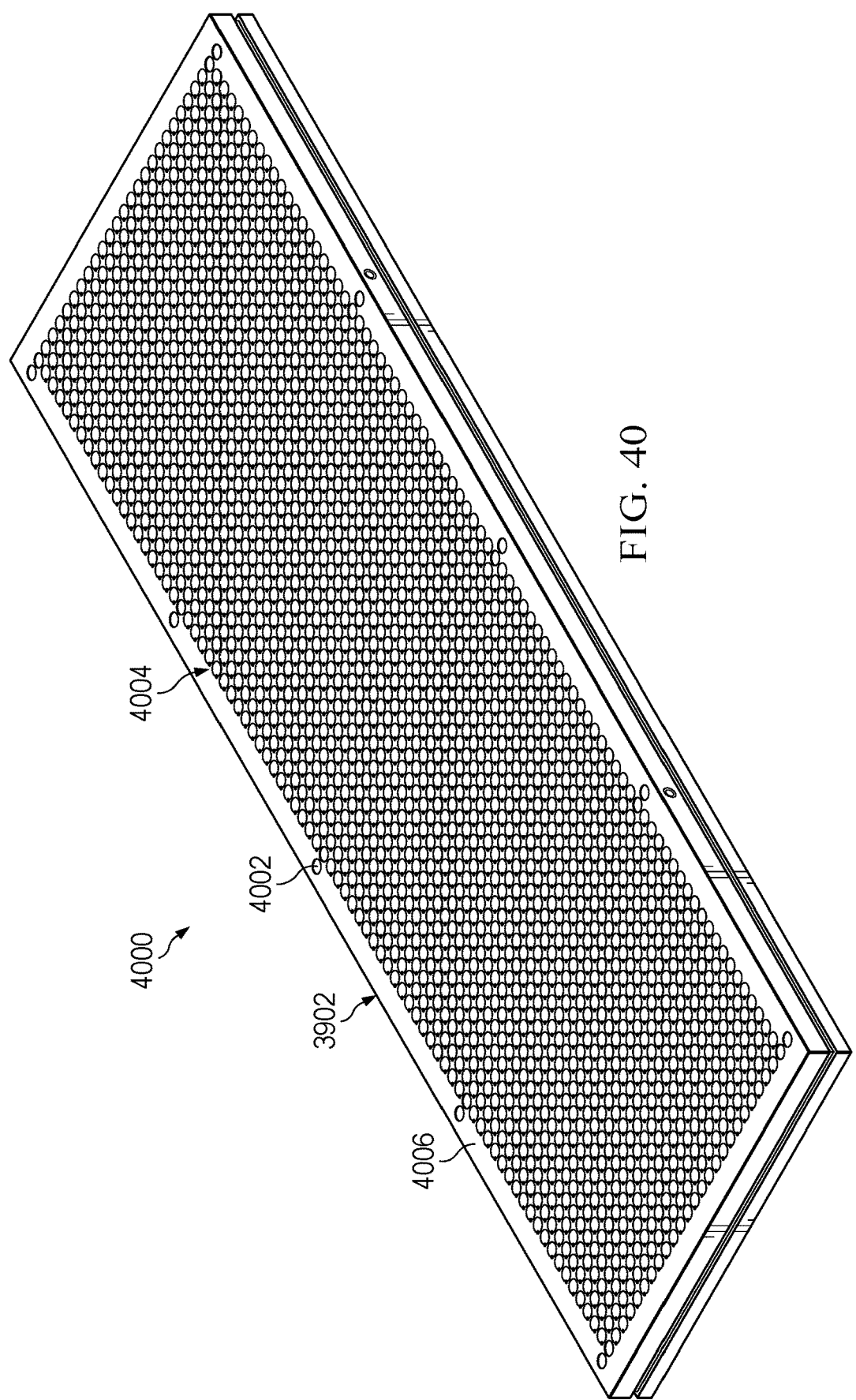
FIG. 40 is an illustration of an isometric view of a wear plate in accordance with an illustrative embodiment.

Turning now to FIG. 40, an illustration of an isometric view of a wear plate is depicted in accordance with an illustrative embodiment. Wear plate 3902 is a physical implementation of wear plate 3010 of FIG. 30. Wear plate 3902 has larger dimensions than wear plate 3100 of FIGS. 31-33. In some illustrative examples, wear plate 3902 can be used to locate, hold, and support a larger workpiece while wear plate 3100 can be used to locate, hold, and support a smaller workpiece. Thus, wear plate 3010 is a scalable design.

Wear plate 3902 is a universal solution to various machine platforms. Wear plate 3902 encompasses the three primary functions of workholding: holding, locating, and supporting.

In view 4000, lift hoist locations 4002, plurality of tool holes 4004, and precision datum face 4006 are visible. Wear plate 3902 includes lift hoist locations 4002 for crane access of unloading and loading. Plurality of tool holes 4004 are present in grid 4008 extending through precision datum face 4006. The three primary functions of workholding: holding, locating, and supporting each exist in each tool hole of plurality of tool holes 4004.

Precision datum face 4006 is a precision flat surface plate incorporated into wear plate 3902 to accurately locate a workpiece flat relative to the primary machine axis. Plurality of tool holes 4004 accurately locates a workpiece relative to secondary and tertiary machine axis. Plurality of tool holes 4004 comprises a precision tooling hole and thread grid pattern incorporated into wear plate 3902.

Figure 41:
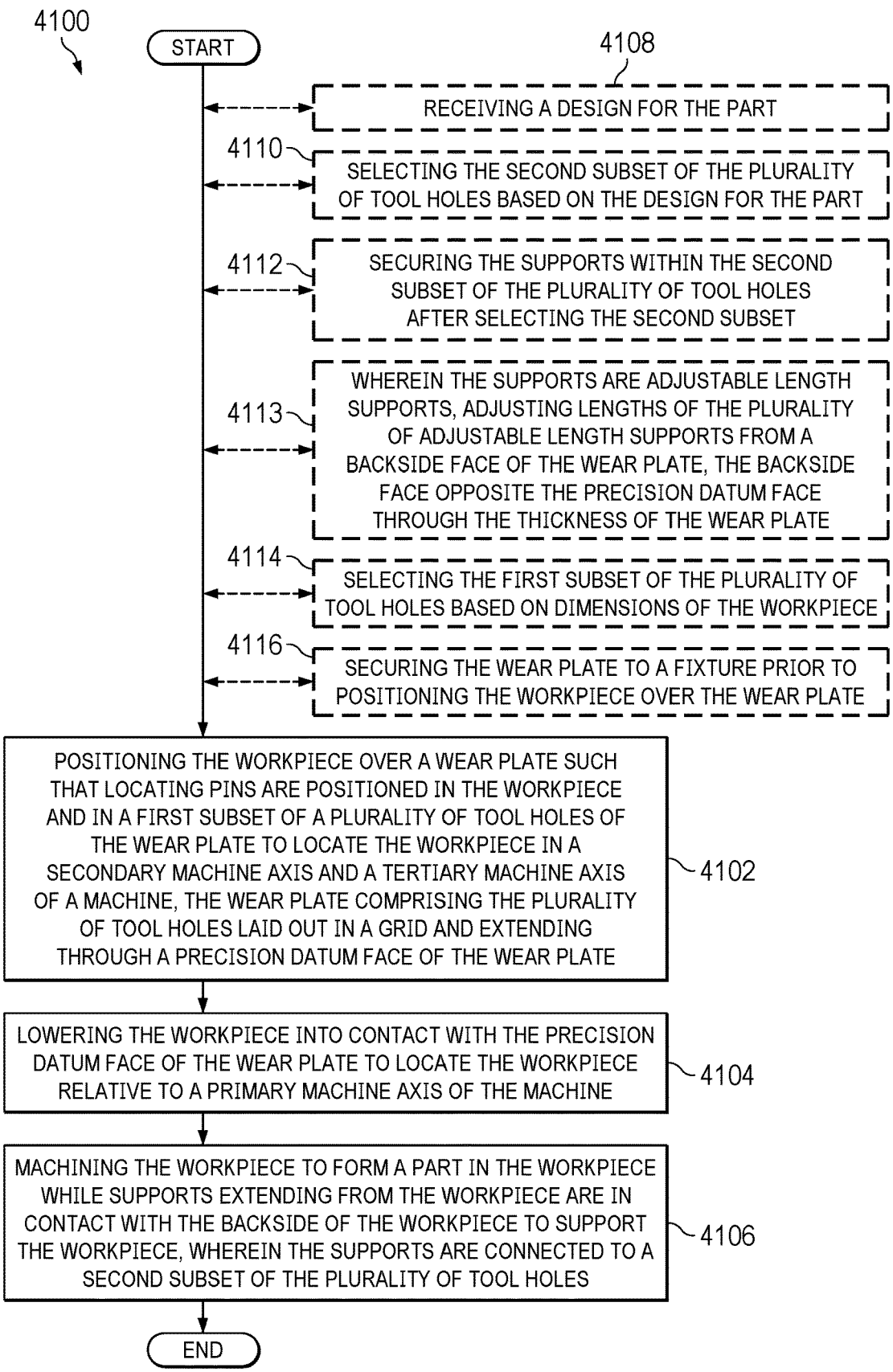
FIG. 41 is a flowchart of a method of machining a workpiece in accordance with an illustrative embodiment.

Turning now to FIG. 41, a flowchart of a method of machining a workpiece is depicted in accordance with an illustrative embodiment. Method 4100 can be performed using adaptive tooling fixture 200 of FIG. 1, and 22-25. Method 4100 can be performed using axial locking mechanism 100 of FIGS. 1-25. Method 4100 can be performed using adaptive workpiece support system 3008 of FIG. 30. Method 4100 can be performed using wear plate 3100 of FIGS. 31-33. Method 4100 can be performed using adaptive workpiece support system 3401 of FIGS. 34-38. Method 4100 can be performed using wear plate 3902 of FIG. 39. Method 4100 can be performed using wear plate 3902 of FIG. 39. Method 4100 can be performed using wear plate 3902 of FIG. 40.

Method 4100 positions the workpiece over a wear plate such that locating pins are positioned in the workpiece and in a first subset of a plurality of tool holes of the wear plate to locate the workpiece in a secondary machine axis and a tertiary machine axis of a machine, the wear plate comprising the plurality of tool holes laid out in a grid and extending through a precision datum face of the wear plate (operation 4102). Method 4100 lowers the workpiece into contact with the precision datum face of the wear plate to locate the workpiece relative to a primary machine axis of the machine (operation 4104). Method 4100 machines the workpiece to form a part in the workpiece while supports extending from the workpiece are in contact with the backside of the workpiece to support the workpiece, wherein the supports are connected to a second subset of the plurality of tool holes (operation 4106). Afterwards, method 4100 terminates.

In some illustrative examples, the wear plate can be used to hold, locate, and support the workpiece without an additional fixture plate, such as a machining plate. In some illustrative examples, method 4100 secures the wear plate to a fixture prior to positioning the workpiece over the wear plate (operation 4116). In some illustrative examples, the fixture takes the form of a fixture plate with a support surface and a plurality of screw holes.

In some illustrative examples, method 4100 receives a design for the part (operation 4108). In some illustrative examples, the design for the part includes dimensions of the part. In some illustrative examples, the design for the part includes a location and orientation of the part in the workpiece.

In some illustrative examples, method 4100 selects the second subset of the plurality of tool holes based on the design for the part (operation 4110). In some illustrative examples, the second subset is selected to support a back surface of the workpiece under an area to be machined. In some illustrative examples, the second subset is selected to reduce chatter in the workpiece during machining. In some illustrative examples, the second subset is selected to be opposite a surface of the part to be formed with a thickness below a threshold.

In some illustrative examples, method 4100 secures the supports within the second subset of the plurality of tool holes after selecting the second subset (operation 4112). In some illustrative examples, the supports are adjustable length supports, and method 4100 adjusts lengths of the plurality of adjustable length supports from a backside face of the wear plate, the backside face opposite the precision datum face through the thickness of the wear plate (operation 4113).

In some illustrative examples, method 4100 selects the first subset of the plurality of tool holes based on dimensions of the workpiece (operation 4114). In some illustrative examples, the first subset of the plurality of tool holes is positioned to interface with a perimeter of the workpiece. In some illustrative examples, the workpiece is secured to the wear plate by a number of bolts connected to a third subset of the plurality of tool holes. In some illustrative examples, the number of bolts is secured in the corners of the workpiece.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 4108 through operation 4116 may be optional.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

As used herein, the phrase "along an axis" such as in reference to a location or a position along an axis, movement along an axis, and similar phrases, refers to an item being positioned or moving at least approximately parallel to or coincident with the axis.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-25 and 28, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-25 and 28, referred to above, need be included in every example and not all elements, features, and/or components described herein are necessarily depicted in each illustrative example. Accordingly, some of the elements, features, and/or components described and illustrated in FIGS. 1-25 and 28 may be combined in various ways without the need to include other features described and illustrated in FIGS. 1-25 and 28, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-25 and 28, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-25 and 28, and such elements, features, and/or components may not be discussed in detail herein with reference to each of FIGS. 1-25 and 28. Similarly, all elements, features, and/or components may not be labeled in each of FIGS. 1-25 and 28, but reference numerals associated therewith may be utilized herein for consistency.

In FIGS. 26 and 27, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 26 and 27 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the axial locking mechanism 100, the adaptive tooling fixture 200, and the method 1000 have been shown and described, modifications may occur to those skilled in the art upon reading the specification. The present application includes such modifications and is limited only by the scope of the claims.

Disclosed are examples of an axial locking mechanism, an adaptive tooling fixture, and a method for supporting a workpiece. Other examples of the axial locking mechanism, the adaptive tooling fixture, and the method disclosed herein will become apparent from the detailed description, the accompanying drawings, and the appended claims.

In an example, the disclosed axial locking mechanism includes a lock and a rod. The lock includes a lock aperture and an axis passing through the lock aperture. The rod is receivable by the lock aperture along the axis. In a first rotational orientation about the axis, the rod is movable within the lock aperture along the axis and relative to the lock. In a second rotational orientation about the axis, the rod is fixed within the lock aperture along the axis and relative to the lock.

In an example, the disclosed adaptive tooling fixture includes a base and a plurality of axial locking mechanisms coupled to the base. Each one of the axial locking mechanisms includes a lock and a rod. The lock includes a lock aperture and an axis passing through the lock aperture. The rod is insertable through the lock aperture along the axis. In a first rotational orientation about the axis, the rod is movable within the lock aperture along the axis and relative to the lock. In a second rotational orientation about the axis, the rod is fixed within the lock aperture along the axis and relative to the lock.

In an example, the disclosed method includes steps of: (1) in a first rotational orientation, moving a rod along an axis within a lock aperture of a lock until an end of the rod is in contact with a workpiece; (2) rotating at least one of the rod and the lock about the axis to a second rotational orientation; and in the second rotational orientation, fixing the rod along the axis within the lock aperture.

Clause 1. An axial locking mechanism comprising: a lock comprising a lock aperture and an axis passing through the lock aperture; and a rod receivable by the lock aperture along the axis, wherein: in a first rotational orientation about the axis, the rod is movable within the lock aperture along the axis and relative to the lock; and in a second rotational orientation about the axis, the rod is fixed within the lock aperture along the axis and relative to the lock.

Clause 2. The axial locking mechanism of Clause 1, wherein rotation of at least one of the rod and the lock about the axis from the first rotational orientation to the second rotational orientation transitions the rod from a clearance fit state to an interference fit state within the lock aperture.

Clause 3. The axial locking mechanism of Clause 1, wherein: the rod has a first cross-sectional shape viewed along the axis; and the lock aperture has a second cross-sectional shape viewed along the axis.

Clause 4. The axial locking mechanism of Clause 3, wherein the first cross-sectional shape and the second cross-sectional shape are the same.

Clause 5. The axial locking mechanism of Clause 3, wherein the first cross-sectional shape and the second cross-sectional shape are polygons.

Clause 6. The axial locking mechanism of Clause 3, wherein the first cross-sectional shape and the second cross-sectional shape are a hexagon.

Clause 7. The axial locking mechanism of Clause 3, wherein the first cross-sectional shape and the second cross-sectional shape are different.

Clause 8. The axial locking mechanism of Clause 1, wherein in the second rotational orientation about the axis, the rod and the lock physically interfere with each other.

Clause 9. The axial locking mechanism of Clause 1, wherein: the lock comprises first material; the rod comprises a second material; and the first material is harder than the second material.

Clause 10. The axial locking mechanism of Clause 1, wherein: the lock comprises a continuous side wall forming a perimeter of the lock aperture; the continuous side wall is parallel to a plane that is parallel to the axis; and an axial location of the rod along the axis remains fixed during rotational motion about the axis from the first rotational orientation to the second rotational orientation.

Clause 11. The axial locking mechanism of Clause 10, wherein: the lock comprises a continuous side wall forming a perimeter of the lock aperture; the continuous side wall is orientated at an oblique angle relative to a plane that is parallel to the axis; and an axial location of the rod along the axis remains changes during rotational motion about the axis from the first rotational orientation to the second rotational orientation.

Clause 12. The axial locking mechanism of Clause 1, wherein the lock further comprises a stop that limits rotation of the rod about the axis within the lock aperture.

Clause 13. The axial locking mechanism of Clause 1, further comprising a cushion located on an end of the rod.

Clause 14. The axial locking mechanism of Clause 13, further comprising an adhesive located on an end of the rod.

Clause 15. The axial locking mechanism of Clause 1, further comprising a guide comprising a guide aperture, wherein: the axis passes through the guide aperture; and the rod is receivable by the guide aperture along the axis.

Clause 16. The axial locking mechanism of Clause 1, further comprising a second lock comprising a second lock aperture, wherein: the axis passes through the second lock aperture; the second lock is spaced apart from the lock along the axis; the rod is receivable by the second lock aperture along the axis; in the first rotational orientation about the axis, the rod is movable within the second lock aperture along the axis and relative to the second lock; and in the second rotational orientation about the axis, the rod is fixed within the second lock aperture along the axis and relative to the second lock.

Clause 17. An adaptive tooling fixture comprising: a base; and a plurality of axial locking mechanisms coupled to the base, wherein: each one of the axial locking mechanisms comprises: a lock comprising a lock aperture and an axis passing through the lock aperture; and a rod insertable through the lock aperture along the axis, in a first rotational orientation about the axis, the rod is movable within the lock aperture along the axis and relative to the lock; and in a second rotational orientation about the axis, the rod is fixed within the lock aperture along the axis and relative to the lock.

Clause 18. The adaptive tooling fixture of Clause 17, wherein rotation of at least one of the rod and the lock about the axis from the first rotational orientation to the second rotational orientation transitions the rod from a clearance fit state to an interference fit state within the lock aperture.

Clause 19. A method for supporting a workpiece, the method comprising steps of: in a first rotational orientation, moving a rod along an axis within a lock aperture of a lock until a first rod end of the rod is in contact with the workpiece; rotating at least one of the rod and the lock about the axis to a second rotational orientation; and in the second rotational orientation, fixing the rod along the axis within the lock aperture.

Clause 20. The method of Clause 19, wherein the step of rotating at least one of the rod and the lock about the axis from the first rotational orientation to the second rotational orientation transitions the rod from a clearance fit state to an interference fit state within the lock aperture.

An axial locking mechanism includes a lock and a rod. The lock includes a lock aperture and an axis passing through the lock aperture. The rod is receivable by the lock aperture along the axis. In a first rotational orientation about the axis, the rod is movable within the lock aperture along the axis and relative to the lock. In a second rotational orientation about the axis, the rod is fixed within the lock aperture along the axis and relative to the lock.

Aluminum parts can be fabricated using high speed machining practices supported, held, and located using the illustrative examples. Each part comes with its own challenges and potential fixturing methods to hold or support the part for fabrication. The illustrative examples present an adaptable system to support rapid manufacturing of parts without dedicated fixturing.

The illustrative examples reduce or prevent chatter on thin floors and walls of aluminum parts during machining. The illustrative examples present alternatives to large conventional fixture plates. As long as the floors of the workpiece are supported, chatter can be reduced or eliminated in forming the part.

Conventional dedicated fixtures are single use and cannot adapt to different part geometries. The illustrative examples enable rapid manufacturing solutions for producing prototypes or low rate parts. The illustrative examples reduce labor for machining prototypes or low rate parts by not having to design dedicated fixturing solutions. The illustrative examples reduce labor for machining prototypes or low rate parts by not having to develop manufacturing toolpath strategies for reducing chatter in different part configurations. The illustrative examples reduce non-recurring and recurring effort to adequately support rapid manufacturing concepts for machining.

The illustrative examples provide a reconfigurable workholding solution that can accommodate different part sizes, different complexities, and can complete all three primary functions such as holding, locating and supporting without integrating additional workholding devices.

The illustrative examples encompass all three of the primary functions of workholding (Holding, Locating and Supporting). The illustrative examples include a precision flat surface plate (incorporated into wear plate) to accurately locate machine parts flat relative to the primary machine axis. The illustrative examples include a precision tooling hole grid pattern (incorporated into wear plate) that accurately locates machine parts relative to secondary and tertiary machine axis. The illustrative examples include a hardened threaded insert grid pattern (incorporated into wear plate) that provides threaded holes for work holding the part for machining. The illustrative examples include a backside counter bore grid pattern (incorporated into wear plate) to allow for quick disconnect of a support (such as a Hex Bar) w/backside clearance for industry standard sockets. The supports provide a backside rigid support post for work hold damping and adaptive freeform part features. The supports can include hex work supports of standard lengths (Adaptive Work Supports). In some illustrative examples, epoxy adhesive is applied as an adhesive for holding the workpiece against the supports. The features of the illustrative examples provide a single solution that can adapt to complex geometries of varying sizes and shapes while providing rigid supports that can eliminate chatter by damping the cuttings forces in all directions.

The illustrative examples provide a reconfigurable solution and green technology that can standardize and adapt to provide adequate backup support, holding and quick setup solutions to freeform shape and complex geometries for manufacturing. Unlike conventional fixed/dedicated fixtures the illustrative examples do not need to be engineered, designed, and manufactured for only one specific part (such as designing vacuum support for a specific part design).

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An adaptive workpiece support system comprising:
   a wear plate comprising a precision datum face and a plurality of tool holes laid out in a grid and extending through the precision datum face, a thickness of the wear plate, and a backside face of the wear plate, wherein the wear plate is configured to locate a workpiece relative to three axes of a machine; and
   a plurality of threaded inserts secured within the plurality of tool holes between the precision datum face and the backside face of the wear plate;
   a plurality of locks secured within the plurality of tool holes proximate the backside face of the wear plate;
   a threaded support configured to be adjustably extended through any one of the plurality of tool holes and be connected to the wear plate by a corresponding one of the threaded inserts; and
   a non-threaded support configured to adjustably extended through any one of the plurality of tool holes and be connected to the wear plate by a corresponding one of the locks,
   wherein at least one of the threaded support and the non-threaded support is length adjusted to contact a backside of the workpiece
   to support, locate, and hold the workpiece against the wear plate for machining the workpiece.

2. The adaptive workpiece support system of claim 1, wherein:
   a plurality of the threaded supports and a plurality of the non-threaded supports are connected to the wear plate at a subset of the plurality of tool holes and extend through the precision datum face to contact the backside of the workpiece.

3. The adaptive workpiece support system of claim 1, wherein;
   an extended length of the threaded support is adjusted by rotational movement relative to the corresponding one of the threaded inserts; and
   an extended length of the non-threaded support is adjusted by linear movement relative to the corresponding one of the locks.

4. The adaptive workpiece support system of claim 3, wherein the extended lengths of the threaded support and the non-threaded support extending through the thickness of the wear plate are adjustable from the backside face of the wear plate.

5. The adaptive workpiece support system of claim 1, further comprising:
   locating pins configured to interface with any of the plurality of tool holes to locate the workpiece relative to at least one of the three axes of the machine.

6. The adaptive workpiece support system of claim 1, further comprising:
   bolts configured to extend into the workpiece, engage with any of the plurality of threaded inserts, and hold the workpiece to the wear plate for machining.

7. The adaptive workpiece support system of claim 1, further comprising:
   a number of holding clamps in contact with the wear plate to secure the wear plate to one of a rotating support or a fixture.

8. The adaptive workpiece support system of claim 5, wherein:
at least one of the locating pins is positioned within a first subset of the plurality of tool holes to locate the workpiece relative to at least one of the three axes of the machine;
at least one of a plurality of non-threaded supports is positioned within a second subset of the plurality of tool holes to hold the workpiece; and
at least one of a plurality of threaded supports is positioned within a third subset of the plurality of tool holes to support the workpiece.

9. A wear plate comprising:
a base comprising a precision datum face configured to locate a workpiece flat relative to a primary machine axis, a backside face opposite the precision datum face, and a thickness between the precision datum face and the backside face;
a plurality of tool holes laid out in a grid and extending through the precision datum face, the thickness of the base, and the backside face of the base, wherein the plurality of tool holes is configured to locate the workpiece relative to a secondary machine axis and a tertiary machine axis;
a plurality of threaded inserts secured within at least a portion of the plurality of tool holes between the precision datum face and the backside face of the base; and
a plurality of locks secured within at least a portion of the plurality of tool holes proximate the backside face of the base,
wherein:
each of the threaded inserts is configured for connection of a threaded support to the base at an adjustably extended length through the precision datum face for contact with a backside of the workpiece; and
each of the locks is configured for connection of a non-threaded support to the base at an adjustably extended length through the precision datum face for contact with the backside of the workpiece.

10. The wear plate of claim 9, further comprising:
a holding channel in a side of the base, the holding channel configured to receive a number of holding clamps.

11. The wear plate of claim 9, wherein each of the plurality of locks comprises:
a lock aperture;
a continuous side wall forming a perimeter of the lock aperture and configured to engage at least a portion of the non-threaded fastener when the non-threaded fastener is rotated in the lock aperture; and
an axis passing through the lock aperture; and
wherein:
the lock is configured to permit linear movement of the non-threaded support within the lock aperture along the axis when the non-threaded support is in a first rotational orientation about the axis and relative to the lock; and
the lock is configured to fix linear movement of the non-threaded support within the lock aperture along the axis when the non-threaded support is in a second rotational orientation about the axis and relative to the lock.

12. The wear plate of claim 9, wherein the plurality of tool holes comprises:
a plurality of backside counterbores in the backside face, each of the plurality of backside counterbores having a diameter sufficient to receive a socket of a socket tool.

13. The wear plate of claim 9, wherein the plurality of tool holes comprises:
a plurality of precision bores configured to receive locating pins to locate the workpiece relative to the secondary machine axis and the tertiary machine axis.

14. The wear plate of claim 13, wherein the plurality of precision bores comprise bushings.

15. The wear plate of claim 9 further comprising:
lift hoist locations extending through the precision datum face configured to allow lifting of the wear plate.

16. The wear plate of claim 15, wherein the lift hoist locations comprise threaded holes configured to receive I-bolts.

17. The wear plate of claim 9, wherein each tool hole of the plurality of tool holes comprises a respective precision bore, a respective one of the threaded inserts, respective one of the locks, and a respective backside counterbore coaxially aligned with each other.

18. The wear plate of claim 9, wherein the backside face of the base is configured to rest on a support surface of a fixture.

19. A method of machining a workpiece comprising:
positioning the workpiece over a wear plate such that locating pins are positioned in the workpiece and in a first subset of a plurality of tool holes of the wear plate to locate the workpiece in a secondary machine axis and a tertiary machine axis of a machine, the wear plate comprising the plurality of tool holes laid out in a grid and extending through a precision datum face of the wear plate;
coupling a plurality of threaded supports to the wear plate by a plurality of threaded inserts secured within a second subset of the plurality of tool holes between the precision datum face and a backside face of the wear plate such that the threaded supports area adjustably extended through the precision datum face;
coupling a plurality of non-threaded supports to the wear plate by a plurality of locks secured within a third subset of the plurality of tool holes proximate the backside face of the wear plate such that the non-threaded supports are adjustably extended through the precision datum face;
lowering the workpiece into contact with at least a portion of the plurality of threaded supports and the plurality of non-threaded supports contact a backside surface of the workpiece to hold the workpiece relative to a primary machine axis of the machine; and
machining the workpiece to form a part in the workpiece.

20. The method of claim 19, further comprising:
securing the wear plate to a fixture prior to positioning the workpiece over the wear plate.

21. The method of claim 19, further comprising:
receiving a design for the part; and
selecting the second subset and the third subset of the plurality of tool holes based on the design for the part.

22. The method of claim 19, further comprising:
adhesively securing ends of the non-threaded supports to the backside of the workpiece.

23. The method of claim 19, further comprising:
adjusting extended lengths of the threaded supports and the non-threaded supports from the backside face of the wear plate.

24. The method of claim 19, further comprising:
  selecting the first subset of the plurality of tool holes based on dimensions of the workpiece.

* * * * *